United States Patent
Gao et al.

(10) Patent No.: US 12,553,063 B2
(45) Date of Patent: Feb. 17, 2026

(54) CAS13 FAMILY AAV VECTORS AND USES THEREOF

(71) Applicant: University of Massachusetts, Westborough, MA (US)

(72) Inventors: Guangping Gao, Worcester, MA (US); Alexander Brown, Worcester, MA (US)

(73) Assignee: University of Massachusetts, Westborough, MA (US)

( * ) Notice: Subject to any disclaimer, the term of this patent is extended or adjusted under 35 U.S.C. 154(b) by 1164 days.

(21) Appl. No.: 17/602,313

(22) PCT Filed: Apr. 10, 2020

(86) PCT No.: PCT/US2020/027774
§ 371 (c)(1),
(2) Date: Oct. 8, 2021

(87) PCT Pub. No.: WO2020/210705
PCT Pub. Date: Oct. 15, 2020

(65) Prior Publication Data
US 2022/0186257 A1 Jun. 16, 2022

Related U.S. Application Data

(60) Provisional application No. 62/833,191, filed on Apr. 12, 2019.

(51) Int. Cl.
| | | |
|---|---|---|
| *C12N 15/86* | (2006.01) | |
| *A61P 1/16* | (2006.01) | |
| *C12N 9/22* | (2006.01) | |
| *C12N 9/64* | (2006.01) | |
| *C12N 15/113* | (2010.01) | |
| *C12N 15/90* | (2006.01) | |

(52) U.S. Cl.
CPC ............... *C12N 15/86* (2013.01); *A61P 1/16* (2018.01); *C12N 9/22* (2013.01); *C12N 9/6424* (2013.01); *C12N 15/113* (2013.01); *C12N 15/907* (2013.01); *C12N 2310/20* (2017.05); *C12N 2330/51* (2013.01); *C12N 2750/14143* (2013.01); *C12Y 304/21* (2013.01)

(58) Field of Classification Search
CPC ........ C12N 15/86; C12N 9/22; C12N 9/6424; C12N 15/113; C12N 15/907; C12N 2310/20; C12N 2330/51; C12N 2750/14143; A61P 1/16; C12Y 304/21; C07K 14/775; A61K 48/005
See application file for complete search history.

(56) References Cited

U.S. PATENT DOCUMENTS

| | | |
|---|---|---|
| 5,399,363 A | 3/1995 | Liversidge et al. |
| 5,543,158 A | 8/1996 | Gref et al. |
| 5,552,157 A | 9/1996 | Yagi et al. |
| 5,565,213 A | 10/1996 | Nakamori et al. |
| 5,567,434 A | 10/1996 | Szoka |
| 5,641,515 A | 6/1997 | Ramtoola et al. |
| 5,656,016 A | 8/1997 | Ogden |
| 5,697,899 A | 12/1997 | Hillman et al. |
| 5,738,868 A | 4/1998 | Shinkarenko |
| 5,741,516 A | 4/1998 | Webb et al. |
| 5,770,219 A | 6/1998 | Chiang et al. |
| 5,779,708 A | 7/1998 | Wu |
| 5,783,208 A | 7/1998 | Venkateshwaran et al. |
| 5,795,587 A | 8/1998 | Gao et al. |
| 5,797,898 A | 8/1998 | Santini et al. |
| 6,177,403 B1 | 1/2001 | Stedman et al. |
| 2018/0066279 A9 | 3/2018 | Gao et al. |

OTHER PUBLICATIONS

Xu, Lingfei, et al. "CMV-β-Actin Promoter Directs Higher Expression from an Adeno-Associated Viral Vector in the Liver than the Cytomegalovirus or Elongation Factor 1α Promoter and Results in Therapeutic Levels of Human Factor X in Mice." Human Gene Therapy, vol. 12, No. 5, Mar. 2001, pp. 563-573. (Year: 2001).*
Shen, Xuan, et al. "Characterization of the Relationship of AAV Capsid Domain Swapping to Liver Transduction Efficiency." Molecular Therapy, vol. 15, No. 11, Nov. 2007, pp. 1955-1962. DOI.org (Crossref), https://doi.org/10.1038/sj.mt.6300293. (Year: 2007).*
McCarty, Douglas M. "Self-Complementary AAV Vectors; Advances and Applications." Molecular Therapy, vol. 16, No. 10, Oct. 2008, pp. 1648-1656. DOI.org (Crossref), https://doi.org/10.1038/mt.2008.171. (Year: 2008).*
Senís, Elena, et al. "CRISPR/Cas9-mediated Genome Engineering: An Adeno-associated Viral (AAV) Vector Toolbox." Biotechnology Journal, vol. 9, No. 11, Nov. 2014, pp. 1402-1412. DOI.org (Crossref), https://doi.org/10.1002/biot.201400046. (Year: 2014).*
Abudayyeh, Omar O., et al. "RNA Targeting with CRISPR-Cas13." Nature, vol. 550, No. 7675, Oct. 2017, pp. 280-284. DOI.org (Crossref), https://doi.org/10.1038/nature24049. (Year: 2017).*
Jarrett, Kelsey E., et al. "Somatic Genome Editing with CRISPR/Cas9 Generates and Corrects a Metabolic Disease." Scientific Reports, vol. 7, No. 1, Mar. 2017, p. 44624. DOI.org (Crossref), https://doi.org/10.1038/srep44624. (Year: 2017).*
Petit, Lolita, et al. "Rod Outer Segment Development Influences AAV-Mediated Photoreceptor Transduction After Subretinal Injection." Human Gene Therapy, vol. 28, No. 6, Jun. 2017, pp. 464-481. DOI.org (Crossref), https://doi.org/10.1089/hum.2017.020. (Year: 2017).*

(Continued)

*Primary Examiner* — J. E. Angell
*Assistant Examiner* — Sarah E Allen
(74) *Attorney, Agent, or Firm* — Wolf, Greenfield & Sacks, P.C.

(57) ABSTRACT

Aspects of the disclosure relate to compositions and methods for multiplexed gene silencing in a cell or subject. In some embodiments, the disclosure provides an isolated nucleic acid or an rAAV encoding a transgene comprising a RNA-guided nuclease (RGN) operably linked to a first promoter, and a second promoter operably linked to a multi guide-RNA (multi-gRNA) expression cassette encoding one or more gRNAs targeting a gene associated with hypercholesterolemia or dyslipidemia. In some embodiments, the disclosure provides methods of treating a subject having hypercholesterolemia or dyslipidemia by administering the compositions.

16 Claims, 2 Drawing Sheets
Specification includes a Sequence Listing.

(56) References Cited

OTHER PUBLICATIONS

Mendell, Jerry R., et al. "Single-Dose Gene-Replacement Therapy for Spinal Muscular Atrophy." New England Journal of Medicine, vol. 377, No. 18, Nov. 2017, pp. 1713-1722. DOI.org (Crossref), https://doi.org/10.1056/NEJMoa1706198. (Year: 2017).*
Cao, Jian, et al. "The Multiplexed CRISPR Targeting Platforms." Drug Discovery Today: Technologies, vol. 28, Aug. 2018, pp. 53-61. DOI.org (Crossref), https://doi.org/10.1016/j.ddtec.2018.01.001. (Year: 2018).*
Schindele, Patrick, et al. "Transforming Plant Biology and Breeding with CRISPR /Cas9, Cas12 and Cas13." FEBS Letters, vol. 592, No. 12, Jun. 2018, pp. 1954-1967. DOI.org (Crossref), https://doi.org/10.1002/1873-3468.13073. (Year: 2018).*
Liu, Wenyi, et al. "Applications and Challenges of CRISPR-Cas Gene-Editing to Disease Treatment in Clinics." Precision Clinical Medicine, vol. 4, No. 3, Sep. 2021, pp. 179-191. DOI.org (Crossref), https://doi.org/10.1093/pcmedi/pbab014. (Year: 2021).*
International Search Report and Written Opinion for Application No. PCT/US2020/027774, mailed Jul. 21, 2020.
International Preliminary Report on Patentability for Application No. PCT/US2020/027774, mailed Oct. 21, 2021.
Bourlais et al., Ophthalmic drug delivery systems—recent advances. Prog Retin Eye Res. Jan. 1998;17(1):33-58. doi: 10.1016/s1350-9462(97)00002-5.
Gossen et al., Tight control of gene expression in mammalian cells by tetracycline-responsive promoters. Proc Natl Acad Sci U S A. Jun. 15, 1992;89(12):5547-51. doi: 10.1073/pnas.89.12.5547.
Hansal et al.,. Cutting Edge: Induction of antigen-specific hyporesponsiveness by transplantation of hemopoietic cells containing an MHC class I transgene regulated by a lymphocyte-specific promoter. J Immunol. Aug. 1, 1998;161(3):1063-8.
Harvey et al., Inducible control of gene expression: prospects for gene therapy. Curr Opin Chem Biol. Aug. 1998;2(4):512-8. doi: 10.1016/s1367-5931(98)80128-2.
Konermann et al., Transcriptome Engineering with RNA-Targeting Type VI-D CRISPR Effectors. Cell. Apr. 19, 2018;173(3):665-676.e14. Suppl. Info. 7pages. doi: 10.1016/j.cell.2018.02.033. Epub Mar. 15, 2018.
Magari et al., Pharmacologic control of a humanized gene therapy system implanted into nude mice. J Clin Invest. Dec. 1, 1997;100(11):2865-72. doi: 10.1172/JCI119835.
No et al., Ecdysone-inducible gene expression in mammalian cells and transgenic mice. Proc Natl Acad Sci U S A. Apr. 16, 1996;93(8):3346-51. doi: 10.1073/pnas.93.8.3346.
Piccioli et al., Neuroantibodies: ectopic expression of a recombinant anti-substance P antibody in the central nervous system of transgenic mice. Neuron. Aug. 1995;15(2):373-84. doi: 10.1016/0896-6273(95)90041-1.
Piccioli et al., Neuroantibodies: molecular cloning of a monoclonal antibody against substance P for expression in the central nervous system. Proc Natl Acad Sci U S A. Jul. 1, 1991;88(13):5611-5. doi: 10.1073/pnas.88.13.5611.
Wang et al., Ligand-inducible and liver-specific target gene expression in transgenic mice. Nat Biotechnol. Mar. 1997;15(3):239-43. doi: 10.1038/nbt0397-239.
Wang et al., Positive and negative regulation of gene expression in eukaryotic cells with an inducible transcriptional regulator. Gene Ther. May 1997;4(5):432-41. doi: 10.1038/sj.gt.3300402.
Yoon et al., Streamlined ex vivo and in vivo genome editing in mouse embryos using recombinant adeno-associated viruses. Nat Commun. Jan. 29, 2018;9(1):412. Suppl. Info. 20 pages. doi: 10.1038/s41467-017-02706-7.
Extended European Search Report for Application No. 20788338.0, mailed Jun. 1, 2023.
Chadwick et al., Reduced Blood Lipid Levels With In Vivo CRISPR-Cas9 Base Editing of ANGPTL3. Circulation. Feb. 27, 2018;137(9):975-977. doi: 10.1161/CIRCULATIONAHA.117.031335.
Fitzgerald et al., A Highly Durable RNAi Therapeutic Inhibitor of PCSK9. N Engl J Med. May 4, 2017;376(18):e38. doi: 10.1056/NEJMc1703361.
Granados-Riveron et al., CRISPR-Cas13 Precision Transcriptome Engineering in Cancer. Cancer Res. Aug. 1, 2018;78(15):4107-4113. doi: 10.1158/0008-5472.CAN-18-0785. Epub Jul. 18, 2018.
Jarrett et al., Somatic genome editing with CRISPR/Cas9 generates and corrects a metabolic disease. Sci Rep. Mar. 16, 2017;7:44624. doi: 10.1038/srep44624.
Koornneef et al., Apolipoprotein B knockdown by AAV-delivered shRNA lowers plasma cholesterol in mice. Mol Ther. Apr. 2011;19(4):731-40. doi: 10.1038/mt.2011.6. Epub Feb. 8, 2011.
Thakore et al., RNA-guided transcriptional silencing in vivo with S. aureus CRISPR-Cas9 repressors. Nat Commun. Apr. 26, 2018;9(1):1674. doi: 10.1038/s41467-018-04048-4.
Wang et al., Meganuclease targeting of PCSK9 in macaque liver leads to stable reduction in serum cholesterol. Nat Biotechnol. Sep. 2018;36(8):717-725. doi: 10.1038/nbt.4182. Epub Jul. 9, 2018.
Zhou et al., Deletion of the B-B' and C-C' regions of inverted terminal repeats reduces rAAV productivity but increases transgene expression. Sci Rep. Jul. 14, 2017;7(1):5432. doi: 10.1038/s41598-017-04054-4.

* cited by examiner

CAS13 FAMILY AAV VECTORS AND USES THEREOF

RELATED APPLICATIONS

This application is a national stage filing under 35 U.S.C. § 371 of international PCT application PCT/US2020/027774, filed Apr. 10, 2020, which claims priority under 35 U.S.C. § 119 (e) to U.S. provisional patent application, U.S. Ser. No. 62/833,191, filed Apr. 12, 2019, the entire contents of each of which are incorporated herein by reference.

BACKGROUND

Primary or familial hypercholesterolemia, as well as secondary dyslipidemias, are frequently treated with statin therapy or other small molecule drugs. However, a significant portion of patients are resistant to treatment or develop intolerance to these compounds and are, thus, at elevated risk of cardiovascular disease-associated events. Additionally, therapeutic cost is prohibitively high for many patients, given the chronic pathological nature of these diseases.

SUMMARY

Aspects of the disclosure relate to compositions and methods for silencing one or more target genes in a cell or subject. The disclosure is based, in part, on isolated nucleic acids and vectors (e.g., rAAV vectors) comprising a transgene encoding a first nucleic acid sequence comprising a CB6 promoter operably linked to a RNA-guided nuclease (RGN) and second nucleic acid sequence encoding a multi guide-RNA (multi-gRNA) expression cassette comprising one or more sequences targeting a gene associated with hypercholesterolemia or dyslipidemia (e.g., PSCK9, ANGPTL3, APOB, GFAP, etc.).

Accordingly, in some aspects, the disclosure provides an isolated nucleic acid encoding a transgene flanked by adeno-associated virus (AAV) inverted terminal repeats (ITRs), wherein the transgene comprises: (i) a first nucleic acid sequence encoding an RNA-guided nuclease (RGN) operably linked to a CB6 promoter; and (ii) a second nucleic acid sequence comprising a multi guide-RNA (multi-gRNA) expression cassette.

In some embodiments, an RGN is a Cas13 family protein or a variant thereof. In some embodiments, an RGN is a Cas13RX or a dCas13 protein.

In some embodiments, a multi-gRNA cassette is operably linked to a second promoter. In some embodiments, a second promoter is a RNA polymerase III promoter. In some embodiments, a second promoter is a U6 promoter.

In some embodiments, a multi-gRNA expression cassette encodes a plurality of guide (e.g., targeting) sequences. In some embodiments, a plurality comprises 2, 3, 4, or 5 guide sequences.

In some embodiments, a multi-gRNA expression cassette comprises the following structure:

$DR_{30}$-[guide sequence-$DR_{36}$-guide sequence-$DR_{36}$]$_n$-T wherein: $DR_{30}$ is a Cas13 direct repeat (DR) sequence comprising (or consisting of) 30 nucleotides; the guide sequence comprises between 10 and 35 nucleotides; $DR_{36}$ is a Cas13 direct repeat (DR) sequence comprising (or consisting of) 36 nucleotides; and T is a terminator sequence; and wherein n is an integer between 1 and 50. In some embodiments, a multi-gRNA comprises one or more linking sequences. In some embodiments, the one or more linking sequences comprises one or more restriction endonuclease cleavage sites. In some embodiments, the cleavage sites are recognized by restriction endonucleases that create blunt-ended fragments.

In some embodiments, a multi-gRNA expression cassette encodes one or more guide RNAs (gRNAs) targeting a gene associated with hypercholesterolemia or dyslipidemia. In some embodiments, a gene associated with hypercholesterolemia or dyslipidemia is selected from PSCK9, ANGPTL3, GFAP and APOB.

In some embodiments, a transgene comprises one or more miRNA binding sites.

In some embodiments, at least one of the AAV ITRs is an AAV2 ITR. In some embodiments, at least one ITR is a ΔITR.

In some aspects, the disclosure provides a recombinant adeno-associated virus (rAAV) comprising: (i) an isolated nucleic acid as described herein; and (ii) a capsid protein.

In some embodiments, a rAAV is a self-complementary AAV (scAAV).

In some embodiments, a capsid protein has a tropism for (e.g., targets or preferentially infects) liver tissue. In some embodiments, a capsid protein is an AAV8 or AAV9 capsid protein. In some embodiments, an rAAV is formulated for delivery to the liver.

In some aspects, the disclosure provides a composition comprising an isolated nucleic acid or an rAAV as described herein, and a pharmaceutically acceptable excipient.

In some aspects, the disclosure provides a host cell comprising an isolated nucleic acid or an rAAV as described herein. In some embodiments, a cell is a mammalian cell, bacterial cell, yeast cell, or insect cell.

In some aspects the disclosure relates to a method of treating hypercholesterolemia or dyslipidemia in a subject, the method comprising administering to a subject in need thereof an effective amount of an isolated nucleic acid or an rAAV as described herein.

In some embodiments, the subject is a human.

In some embodiments, the administration of the isolated nucleic acid or rAAV results in silencing of a gene selected from PSCK9, ANGPTL3, GFAP and APOB in cells of the subject. In some embodiments, the cells are hepatocytes.

DETAILED DESCRIPTION

Figure 1:
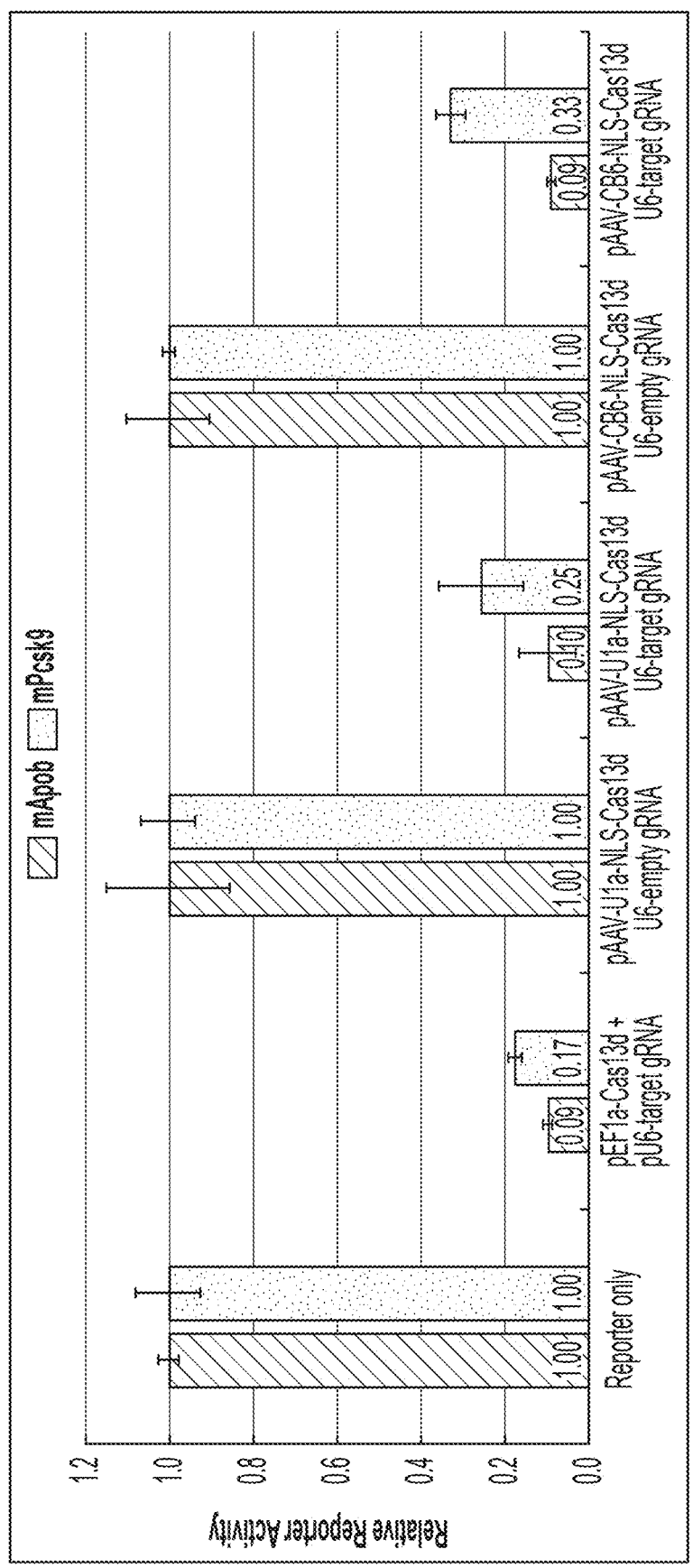
FIG. 1 shows targeted inhibition of mRNA by Cas13d. The cDNA of transcript targets was cloned into reporter plasmids and transfected into cells, followed by enzymatic assay to determine relative % inhibition.

The disclosure relates, in some aspects, to compositions and methods for multiplexed gene silencing in a cell or subject. The disclosure is based, in part, on isolated nucleic acids and vectors encoding a combination of i) an RNA-guided nuclease (RGN) and ii) a multi guide-RNA (multi-gRNA) expression cassette. In some embodiments, the multi-gRNA expression cassette encodes one or more gRNAs that target a gene associated with hypercholesterolemia or dyslipidemia.

Accordingly, in some aspects the disclosure provides an isolated nucleic acid encoding a transgene flanked by adeno-associated virus (AAV) inverted terminal repeats (ITRs), wherein the transgene comprises: (i) a first nucleic acid sequence encoding an RNA-guided nuclease (RGN) operably linked to a CB6 promoter; and (ii) a second nucleic acid sequence multi guide-RNA (multi-gRNA) expression cassette. However, the skilled artisan recognizes that an RGN and a multi-gRNA as described herein may be located on different isolated nucleic acids (e.g., delivered as two or more separate rAAV vectors or rAAVs).

Isolated Nucleic Acids

A "nucleic acid" sequence refers to a DNA or RNA sequence. In some embodiments, proteins and nucleic acids of the disclosure are isolated. As used herein, the term "isolated" means artificially produced. As used herein, with respect to nucleic acids, the term "isolated" means: (i) amplified in vitro by, for example, polymerase chain reaction (PCR); (ii) recombinantly produced by cloning; (iii) purified, as by cleavage and gel separation; or (iv) synthesized by, for example, chemical synthesis. An isolated nucleic acid is one which is readily manipulable by recombinant DNA techniques well known in the art. Thus, a nucleotide sequence contained in a vector in which 5' and 3' restriction sites are known or for which polymerase chain reaction (PCR) primer sequences have been disclosed is considered isolated but a nucleic acid sequence existing in its native state in its natural host is not. An isolated nucleic acid may be substantially purified, but need not be. For example, a nucleic acid that is isolated within a cloning or expression vector is not pure in that it may comprise only a tiny percentage of the material in the cell in which it resides. Such a nucleic acid is isolated, however, as the term is used herein because it is readily manipulable by standard techniques known to those of ordinary skill in the art. As used herein with respect to proteins or peptides, the term "isolated" refers to a protein or peptide that has been isolated from its natural environment or artificially produced (e.g., by chemical synthesis, by recombinant DNA technology, etc.).

In some embodiments, a nucleic acid encodes a RNA-guided nuclease (RGN). Examples of RGNs include but are not limited to Cas9 nucleases, Cas6 nucleases, Cfp1 nucleases, Cas13 nucleases, and variants thereof. A variant of a RGN may comprise or consist of a nucleic acid sequence that comprises one or more substitutions, insertions, and/or deletions relative to a wild-type RGN nucleic acid sequence. In some embodiments, a variant of a RGN comprises or consists of a nucleic acid sequence that is at least 50%, 60%, 70%, 80%, 90%, 95%, or 99% identical to a wild-type RGN nucleic acid sequence. In some embodiments, a variant of a RGN comprises or consists of an amino acid sequence that is at least 50%, 60%, 70%, 80%, 90%, 95%, or 99% identical to a wild-type RGN amino acid sequence. In some embodiments, an RGN is a "dead" RGN, such as an RGN that retains RNA binding functionality but lacks nuclease activity (e.g., is catalytically dead).

In some embodiments, a RGN is a Cas13 nuclease (e.g., a Cas13d nuclease) or a variant thereof. In some embodiments, a variant of a Cas13 nuclease is a dead Cas13 (dCas13) nuclease (e.g., a Cas13 nuclease that lacks nuclease activity but retains RNA binding activity), or a CasRx protein.

An exemplary amino acid sequence for a Cas13d nuclease is set forth in SEQ ID NO: 57:

MGVKSTLVSGSKVYMTTFAEGSDARLEKIVEGDSIRSVNEGEAFSAEMAD

KNAGYKIGNAKFSHPKGYAVVANNPLYTGPVQQDMLGLKETLEKRYFGES

ADGNDNICIQVIHNILDIEKILAEYITNAAYAVNNISGLDKDIIGFGKFS

TVYTYDEFKDPEHHRAAFNNNDKLINAIKAQYDEFDNFLDNPRLGYFGQA

FFSKEGRNYIINYGNECYDILALLSGLRHWVVHNNEEESRISRTWLYNLD

KNLDNEYISTLNYLYDRITNELTNSFSKNSAANVNYIAETLGINPAEFAE

QYFRFSIMKEQKNLGFNITKLREVMLDRKDMSEIRKNHKVFDSIRTKVYT

MMDFVIYRYYIEEDAKVAAANKSLPDNEKSLSEKDIFVINLRGSFNDDQK

DALYYDEANRIWRKLENIMHNIKEFRGNKTREYKKKDAPRLPRILPAGRD

VSAFSKLMYALTMFLDGKEINDLLTTLINKFDNIQSFLKVMPLIGVNAKF

VEEYAFFKDSAKIADELRLIKSFARMGEPIADARRAMYIDAIRILGTNLS

YDELKALADTFSLDENGNKLKKGKHGMRNFIINNVISNKRFHYLIRYGDP

AHLHEIAKNEAVVKFVLGRIADIQKKQGQNGKNQIDRYYETCIGKDKGKS

VSEKVDALTKIITGMNYDQFDKKRSVIEDTGRENAEREKFKKIISLYLTV

IYHILKNIVNINARYVIGFHCVERDAQLYKEKGYDINLKKLEEKGFSSVT

KLCAGIDETAPDKRKDVEKEMAERAKESIDSLESANPKLYANYIKYSDEK

KAEEFTRQINREKAKTALNAYLRNTKWNVIIREDLLRIDNKTCTLFRNKA

VHLEVARYVHAYINDIAEVNSYFQLYHYIMQRIIMNERYEKSSGKVSEYF

DAVNDEKKYNDRLLKLLCVPFGYCIPRFKNLSIEALFDRNEAAKFDKEKK

KVSGNS

An exemplary coding sequence for a Cas13d nuclease is set forth in SEQ ID NO: 58:

ATGGGCGTGAAGTCCACACTCGTGTCCGGCTCCAAAGTGTACATGACAAC

CTTCGCCGAAGGCAGCGACGCCAGGCTGGAAAAGATCGTGGAGGGCGACA

GCATCAGGAGCGTGAATGAGGGCGAGGCCTTCAGCGCTGAAATGGCCGAT

AAAAACGCCGGCTATAAGATCGGCAACGCCAAATTCAGCCATCCTAAGGG

CTACGCCGTGGTGGCTAACAACCCTCTGTATACAGGACCCGTCCAGCAGG

ATATGCTCGGCCTGAAGGAAACTCTGGAAAAGAGGTACTTCGGCGAGAGC

GCTGATGGCAATGACAATATTTGTATCCAGGTGATCCATAACATCCTGGA

CATTGAAAAAATCCTCGCCGAATACATTACCAACGCCGCCTACGCCGTCA

ACAATATCTCCGGCCTGGATAAGGACATTATTGGATTCGGCAAGTTCTCC

ACAGTGTATACCTACGACGAATTCAAAGACCCCGAGCACCATAGGGCCGC

TTTCAACAATAACGATAAGCTCATCAACGCCATCAAGGCCCAGTATGACG

AGTTCGACAACTTCCTCGATAACCCCAGACTCGGCTATTTCGGCCAGGCC

TTTTTCAGCAAGGAGGGCAGAAATTACATCATCAATTACGGCAACGAATG

CTATGACATTCTGGCCCTCCTGAGCGGACTGAGGCACTGGGTGGTCCATA

ACAACGAAGAAGAGTCCAGGATCTCCAGGACCTGGCTCTACAACCTCGAT

AAGAACCTCGACAACGAATACATCTCCACCCTCAACTACCTCTACGACAG

-continued
```
GATCACCAATGAGCTGACCAACTCCTTCTCCAAGAACTCCGCCGCCAACG

TGAACTATATTGCCGAAACTCTGGGAATCAACCCTGCCGAATTCGCCGAA

CAATATTTCAGATTCAGCATTATGAAAGAGCAGAAAAACCTCGGATTCAA

TATCACCAAGCTCAGGGAAGTGATGCTGGACAGGAAGGATATGTCCGAGA

TCAGGAAAAATCATAAGGTGTTCGACTCCATCAGGACCAAGGTCTACACC

ATGATGGACTTTGTGATTTATAGGTATTACATCGAAGAGGATGCCAAGGT

GGCTGCCGCCAATAAGTCCCTCCCCGATAATGAGAAGTCCCTGAGCGAGA

AGGATATCTTTGTGATTAACCTGAGGGGCTCCTTCAACGACGACCAGAAG

GATGCCCTCTACTACGATGAAGCTAATAGAATTTGGAGAAAGCTCGAAAA

TATCATGCACAACATCAAGGAATTTAGGGGAAACAAGACAAGAGAGTATA

AGAAGAAGGACGCCCCTAGACTGCCCAGAATCCTGCCCGCTGGCCGTGAT

GTTTCCGCCTTCAGCAAACTCATGTATGCCCTGACCATGTTCCTGGATGG

CAAGGAGATCAACGACCTCCTGACCACCCTGATTAATAAATTCGATAACA

TCCAGAGCTTCCTGAAGGTGATGCCTCTCATCGGAGTCAACGCTAAGTTC

GTGGAGGAATACGCCTTTTTCAAAGACTCCGCCAAGATCGCCGATGAGCT

GAGGCTGATCAAGTCCTTCGCTAGAATGGGAGAACCTATTGCCGATGCCA

GGAGGGCCATGTATATCGACGCCATCCGTATTTTAGGAACCAACCTGTCC

TATGATGAGCTCAAGGCCCTCGCCGACACCTTTTCCCTGGACGAGAACGG

AAACAAGCTCAAGAAAGGCAAGCACGGCATGAGAAATTTCATTATTAATA

ACGTGATCAGCAATAAAAGGTTCCACTACCTGATCAGATACGGTGATCCT

GCCCACCTCCATGGATCGCCAAAAACGAGGCCGTGGTGAAGTTCGTGCT

CGGCAGGATCGCTGACATCCAGAAAAAACAGGGCCAGAACGGCAAGAACC

AGATCGACAGGTACTACGAAACTTGTATCGGAAAGGATAAGGGCAAGAGC

GTGAGCGAAAAGGTGGACGCTCTCACAAAGATCATCACCGGAATGAACTA

CGACCAATTCGACAAGAAAAGGAGCGTCATTGAGGACACCGGCAGGGAAA

ACGCCGAGAGGGAGAAGTTTAAAAAGATCATCAGCCTGTACCTCACCGTG

ATCTACCACATCCTCAAGAATATTGTCAATATCAACGCCAGGTACGTCAT

CGGATTCCATTGCGTCGAGCGTGATGCTCAACTGTACAAGGAGAAAGGCT

ACGACATCAATCTCAAGAAACTGGAAGAGAAGGGATTCAGCTCCGTCACC

AAGCTCTGCGCTGGCATTGATGAAACTGCCCCCGATAAGAGAAAGGACGT

GGAAAAGGAGATGGCTGAAAGAGCCAAGGAGAGCATTGACAGCCTCGAGA

GCGCCAACCCCAAGCTGTATGCCAATTACATCAAATACAGCGACGAGAAG

AAAGCCGAGGAGTTCACCAGGCAGATTAACAGGGAGAAGGCCAAAACCGC

CCTGAACGCCTACCTGAGGAACACCAAGTGGAATGTGATCATCAGGGAGG

ACCTCCTGAGAATTGACAACAAGACATGTACCCTGTTCAGAAACAAGGCC

GTCCACCTGGAAGTGGCCAGGTATGTCCACGCCTATATCAACGACATTGC

CGAGGTCAATTCCTACTTCCAACTGTACCATTACATCATGCAGAGAATTA

TCATGAATGAGAGGTACGAGAAAAGCAGCGGAAAGGTGTCCGAGTACTTC

GACGCTGTGAATGACGAGAAGAAGTACAACGATAGGCTCCTGAAACTGCT

GTGTGTGCCTTTCGGCTACTGTATCCCCAGGTTTAAGAACCTGAGCATCG

AGGCCCTGTTCGATAGGAACGAGGCCGCCAAGTTCGACAAGGAGAAAAAG

AAGGTGTCCGGCAATTCC
```

Aspects of the disclosure relate to isolated nucleic acids encoding multi guide-RNA (multi-gRNA) expression cassette. In some embodiments, a multi-gRNA expression cassette comprises one or more of the following features: one or more Direct Repeat (DR) sequences, one or more Spacer (e.g., targeting sequences, guide sequences, seed sequences, etc.), and optionally, a 5'AAAAC motif. A "Direct Repeat" or "DR" sequence refers to a polynucleotide that is between 10 and 40 (e.g., 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40) nucleotides in length, and typically comprises an 8-10 nucleotide stem with an A/U-rich loop. In some embodiments, a DR sequence (e.g., a Cas13d DR sequence) is 30, 31, 32, 33, 34, 35, or 36 nucleotides in length. In some embodiments, a DR sequence comprises a 5'AAAAC motif. A "spacer" refers to a nucleic acid sequence that specifically binds (e.g., hybridizes) to or shares a region of complementarity with a target sequence. A spacer sequence may comprise between 5 and 50 nucleotides (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nucleotides). In some embodiments, a spacer sequence comprises between 19 and 31 nucleotides. In some embodiments, a spacer sequence comprises 21, 22, or 23 nucleotides. In some embodiments, a multi-gRNA expression cassette comprises one or more spacer sequences that target (e.g., hybridize to or specifically bind to) one or more genes associated with hypercholesterolemia (e.g., PSCK9, ANGPTL3, APOB, or any combination thereof).

In some embodiments, a multi-gRNA expression cassette has the following structure (architecture):

$DR_{30}$-[guide sequence-$DR_{36}$-guide sequence-$DR_{36}$]$_n$-T where $DR_{30}$ is a Cas13 direct repeat (DR) sequence comprising (or consisting of) 30 nucleotides; the guide sequence comprises between 10 and 35 nucleotides; $DR_{36}$ is a Cas13 direct repeat (DR) sequence comprising (or consisting of) 36 nucleotides; and T is a terminator sequence; and wherein n is an integer between 1 and 50.

In some embodiments, a guide sequence, or multi guide-RNA (multi-gRNA) expression cassette, comprises one or more sequences set forth in Table 1:

TABLE 1

| ID | Sequence |
|---|---|
| oAB402 mApob C13d sgRNA 1 (+) | aaacCCAAAGTCCTTTAAATAGACC (SEQ ID NO: 1) |
| oAB403 mApob C13d sgRNA 1 (-) | aaaaGGTCTATTTAAAGGACTTTGG (SEQ ID NO: 2) |
| oAB404 mApob C13d sgRNA 2 (+) | aaacCCCAAAGTCCTTTAAATAGAC (SEQ ID NO: 3) |

TABLE 1-continued

| ID | Sequence |
|---|---|
| oAB405 mApob C13d sgRNA 2 (-) | aaaaGTCTATTTAAAGGACTTTGGG (SEQ ID NO: 4) |
| oAB406 mApob C13d sgRNA 3 (+) | aaacATTCAGCTCCACACTCTGGTC (SEQ ID NO: 5) |
| oAB407 mApob C13d sgRNA 3 (-) | aaaaGACCAGAGTGTGGAGCTGAAT (SEQ ID NO: 6) |
| oAB408 mPcsk9 C13d sgRNA 1 (+) | aaacAGAACCTTGATGACATAGCCC (SEQ ID NO: 7) |
| oAB409 mPcsk9 C13d sgRNA 1 (-) | aaaaGGGCTATGTCATCAAGGTTCT (SEQ ID NO: 8) |
| oAB410 mPcsk9 C13d sgRNA 2 (+) | aaacGGATAATTCGCTCCAGGTTCC (SEQ ID NO: 9) |
| oAB411 mPcsk9 C13d sgRNA 2 (-) | aaaaGGAACCTGGAGCGAATTATCC (SEQ ID NO: 10) |
| oAB412 mPcsk9 C13d sgRNA 3 (+) | aaacGTAGAACCTTGATGACATAGC (SEQ ID NO: 11) |
| oAB413 mPcsk9 C13d sgRNA 3 (-) | aaaaGCTATGTCATCAAGGTTCTAC (SEQ ID NO: 12) |
| oAB437 mApoB.3 AB gRNA(+) | aaacATTCAGCTCCACACTCTGGTCATCTGTGCT (SEQ ID NO: 13) |
| oAB438 mApoB.3 A gRNA(-) | cttgAGCACAGATGACCAGAGTGTGGAGCTGAAT (SEQ ID NO: 14) |
| oAB439 mApoB.3 B gRNA(-) | aaaaAGCACAGATGACCAGAGTGTGGAGCTGAAT (SEQ ID NO: 15) |
| oAB440 mPCSK9.2 AB gRNA(+) | aaacGGATAATTCGCTCCAGGTTCCATGGGATGC (SEQ ID NO: 16) |
| oAB441 mPCSK9.2 A gRNA(-) | cttgGCATCCCATGGAACCTGGAGCGAATTATCC (SEQ ID NO: 17) |
| oAB442 mPCSK9.2 B gRNA(-) | aaaaGCATCCCATGGAACCTGGAGCGAATTATCC (SEQ ID NO: 18) |
| oAB443 C13d mgRNA cassette (+) | AAACggGTCTTCgaGAAGACctCAAGTAAACCCCTACCAACTGGTCGGGGTTTGAAACgGAGACCgaGGTCTCc (SEQ ID NO: 19) |
| oAB444 C13d mgRNA cassette (-) | AAAAgGAGACCtcGGTCTCcGTTTCAAACCCCGACCAGTTGGTAGGGGTTTACTTGagGTCTTCtcGAAGACcc (SEQ ID NO: 20) |
| oAB445 hmrGFAP.1 C13d gRNA (+) | aaacGCAAAGCGGTCATTGAGCTCCATCATCTC (SEQ ID NO: 21) |
| oAB446 hmrGFAP.1 C13d gRNA (-) | aaaaGAGATGATGGAGCTCAATGACCGCTTTGC (SEQ ID NO: 22) |
| oAB447 hmrGFAP.2 C13d gRNA (+) | aaacAAGCGGTCATTGAGCTCCATCATC (SEQ ID NO: 23) |
| oAB448 hmrGFAP.2 C13d gRNA (-) | aaaaGATGATGGAGCTCAATGACCGCTT (SEQ ID NO: 24) |
| oAB449 hmrGFAP.3 C13d gRNA (+) | aaacCTTGTTTTGCTGTTCCAGGAAGCG (SEQ ID NO: 25) |
| oAB450 hmrGFAP.3 C13d gRNA (-) | aaaaCGCTTCCTGGAACAGCAAAACAAG (SEQ ID NO: 26) |
| oAB451 hmrGFAP.4 C13d gRNA (+) | aaacTTCCTGTAGGTGGCGATCTCGATGTCCAGG (SEQ ID NO: 27) |
| oAB452 hmrGFAP.4 C13d gRNA (-) | aaaaCCTGGACATCGAGATCGCCACCTACAGGAA (SEQ ID NO: 28) |

TABLE 1-continued

| ID | Sequence |
|---|---|
| oAB468 hmANGPTL3.1 C13d gRNA (+) | aaacAACATAGCAAATCTTGATTTTGGCTCTG (SEQ ID NO: 29) |
| oAB469 hmANGPTL3.1 C13d gRNA (-) | aaaaCAGAGCCAAAATCAAGATTTGCTATGTT (SEQ ID NO: 30) |
| oAB470 hmANGPTL3.2 C13d gRNA (+) | aaacTCATAAAAAGACTGATCAAATATGTTGAG (SEQ ID NO: 31) |
| oAB471 hmANGPTL3.2 C13d gRNA (-) | aaaaCTCAACATATTTGATCAGTCTTTTTATGA (SEQ ID NO: 32) |
| oAB472 hmANGPTL3.3 C13d gRNA (+) | aaacGGGAGTAGTTCTTGGTGCTCTTG (SEQ ID NO: 33) |
| oAB473 hmANGPTL3.3 C13d gRNA (-) | aaaaCAAGAGCACCAAGAACTACTCCC (SEQ ID NO: 34) |
| oAB474 hmANGPTL3.4 C13d gRNA (+) | aaacTGTTGAATTAATGTCCATGGACT (SEQ ID NO: 35) |
| oAB475 hmANGPTL3.4 C13d gRNA (-) | aaaaAGTCCATGGACATTAATTCAACA (SEQ ID NO: 36) |
| oAB476 hmANGPTL3.5 C13d gRNA (+) | aaacATCTTCTCTAGGCCCAACCAAAATTCTCCATC (SEQ ID NO: 37) |
| oAB477 hmANGPTL3.5 C13d gRNA (-) | aaaaGATGGAGAATTTTGGTTGGGCCTAGAGAAGAT (SEQ ID NO: 38) |
| oAB478 hmANGPTL3.6 C13d gRNA (+) | aaacCCATTTAGGTTGTTTTCTCCACA (SEQ ID NO: 39) |
| oAB 479 hmANGPTL3.6 C13d gRNA (-) | aaaaTGTGGAGAAAACAACCTAAATGG (SEQ ID NO: 40) |
| oAB485 mPcsk9.2 LguI (+) | aacGGATAATTCGCTCCAGGTTCCATGGGATGC (SEQ ID NO: 41) |
| oAB486 mPcsk9.2 LguI (-) | ttgGCATCCCATGGAACCTGGAGCGAATTATCC (SEQ ID NO: 42) |
| oAB487 hmPCSK9.4 gRNA (+) | aaacTTCCGAATAAACTCCAGGCCTATGAGGGTG (SEQ ID NO: 43) |
| oAB488 hmPCSK9.4 gRNA (-) | aaaaCACCCTCATAGGCCTGGAGTTTATTCGGAA (SEQ ID NO: 44) |
| oAB489 hmPCSK9.5 gRNA (+) | aaacAATAAACTCCAGGCCTATGAGGGTGCCGCT (SEQ ID NO: 45) |
| oAB490 hmPCSK9.5 gRNA (-) | aaaaAGCGGCACCCTCATAGGCCTGGAGTTTATT (SEQ ID NO: 46) |
| oAB491 hmrGFAP.5 gRNA (+) | aaacCCTGTAGGTGGCGATCTCGATGTCCAGGGC (SEQ ID NO: 47) |
| oAB492 hmrGFAP.5 gRNA (-) | aaaaGCCCTGGACATCGAGATCGCCACCTACAGG (SEQ ID NO: 48) |
| oAB493 hmrGFAP.6 gRNA (+) | aaacGCCAGCGCCTTGTTTTGCTGTTCCAGGAAGCG (SEQ ID NO: 49) |
| oAB494 hmrGFAP.6 gRNA (-) | aaaaCGCTTCCTGGAACAGCAAAACAAGGCGCTGGC (SEQ ID NO: 50) |
| oAB495 hmApob.1 gRNA (+) | aaacCAAGGCTTGTAAAGTGATGGGGCTGGACAC (SEQ ID NO: 51) |
| oAB496 hmApob.1 gRNA (-) | aaaaGTGTCCAGCCCCATCACTTTACAAGCCTTG (SEQ ID NO: 52) |
| oAB497 hmApob.2 gRNA (+) | aaacGGCTGTCCACACTGAACCAAGGCTTGTAAA (SEQ ID NO: 53) |
| oAB498 hmApob.2 gRNA (-) | aaaaTTTACAAGCCTTGGTTCAGTGTGGACAGCC (SEQ ID NO: 54) |

TABLE 1-continued

| ID | Sequence |
|---|---|
| oAB507 hmANGPTL3.3A C13d gRNA (+) | aaacGGGAGTAGTTCTTGGTGCTCTTG (SEQ ID NO: 55) |
| oAB508 hmANGPTL3.3A C13d gRNA (−) | cttgCAAGAGCACCAAGAACTACTCCC (SEQ ID NO: 56) |

In some embodiments, a multi-gRNA comprises one or more linking sequences (e.g., a linking polynucleotide). In some embodiments, the one or more linking sequences comprises one or more restriction endonuclease cleavage sites. In some embodiments, the cleavage sites are recognized by restriction endonucleases that create blunt-ended fragments. Examples of restriction endonucleases include BbsI, BsaI, LguI, etc.

A transgene (e.g., a nucleic acid sequence encoding a RGN and/or a multi-gRNA expression cassette) may comprise one or more nucleic acid sequences operably linked to one or more promoters. In some embodiments, two nucleic acid sequences are operably linked to the same promoter. In some embodiments, a first nucleic acid is operably linked to a first promoter and a second nucleic acid sequence is operably linked to a second promoter. The promoters may be the same promoters or different promoters. In some embodiments, the first promoter is a chicken beta-actin (CB) promoter or a murine small nuclear RNA (U1a) promoter. In some embodiments, the second promoter is a human U6 promoter. In some embodiments, the promoter is a GFAP promoter.

As used herein, a nucleic acid sequence (e.g., coding sequence) and regulatory sequences are said to be "operably linked" when they are covalently linked in such a way as to place the expression or transcription of the nucleic acid sequence under the influence or control of the regulatory sequences. If it is desired that the nucleic acid sequences be translated into a functional protein, two DNA sequences are said to be operably linked if induction of a promoter in the 5' regulatory sequences results in the transcription of the coding sequence and if the nature of the linkage between the two DNA sequences does not (1) result in the introduction of a frame-shift mutation, (2) interfere with the ability of the promoter region to direct the transcription of the coding sequences, or (3) interfere with the ability of the corresponding RNA transcript to be translated into a protein. Thus, a promoter region would be operably linked to a nucleic acid sequence if the promoter region were capable of effecting transcription of that DNA sequence such that the resulting transcript might be translated into the desired protein or polypeptide. Similarly two or more coding regions are operably linked when they are linked in such a way that their transcription from a common promoter results in the expression of two or more proteins having been translated in frame.

A "promoter" refers to a DNA sequence recognized by the synthetic machinery of the cell, or introduced synthetic machinery, required to initiate the specific transcription of a gene. The phrases "operatively linked," "operatively positioned," "under control" or "under transcriptional control" means that the promoter is in the correct location and orientation in relation to the nucleic acid to control RNA polymerase initiation and expression of the gene. In some embodiments, a transgene comprises a nucleic acid sequence encoding a RGN (e.g., a Cas13d nuclease) operably linked to a first promoter and a multi-gRNA expression cassette operably linked to a second promoter.

Generally, a promoter can be a constitutive promoter, inducible promoter, or a tissue-specific promoter.

Examples of constitutive promoters include, without limitation, the retroviral Rous sarcoma virus (RSV) LTR promoter (optionally with the RSV enhancer), the cytomegalovirus (CMV) promoter (optionally with the CMV enhancer) [see, e.g., Boshart et al., Cell, 41:521-530 (1985)], the SV40 promoter, the dihydrofolate reductase promoter, the β-actin promoter, the phosphoglycerol kinase (PGK) promoter, and the EF1α promoter [INVITROGEN®] In some embodiments, a promoter is an RNA pol II promoter. In some embodiments, a promoter is an RNA pol III promoter, such as U6 or H1. In some embodiments, a promoter is an RNA pol II promoter. In some embodiments, a nucleic acid encoding a RGN is operably linked to a CB6 promoter. In some embodiments, a nucleic acid sequence encoding a multi-RNA expression cassette is operably linked to a RNA pol III promoter. In some embodiments, the RNA pol III promoter is a U6 promoter.

Examples of inducible promoters regulated by exogenously supplied promoters include the zinc-inducible sheep metallothionine (MT) promoter, the dexamethasone (Dex)-inducible mouse mammary tumor virus (MMTV) promoter, the T7 polymerase promoter system (WO 98/10088); the ecdysone insect promoter (No et al., Proc. Natl. Acad. Sci. USA, 93:3346-3351 (1996)), the tetracycline-repressible system (Gossen et al., Proc. Natl. Acad. Sci. USA, 89:5547-5551 (1992)), the tetracycline-inducible system (Gossen et al., Science, 268:1766-1769 (1995), see also Harvey et al., Curr. Opin. Chem. Biol., 2:512-518 (1998)), the RU486-inducible system (Wang et al., Nat. Biotech., 15:239-243 (1997) and Wang et al., Gene Ther., 4:432-441 (1997)) and the rapamycin-inducible system (Magari et al., J. Clin. Invest., 100:2865-2872 (1997)). Still other types of inducible promoters which may be useful in this context are those which are regulated by a specific physiological state, e.g., temperature, acute phase, a particular differentiation state of the cell, or in replicating cells only.

In another embodiment, the native promoter for the transgene will be used. The native promoter may be preferred when it is desired that expression of the transgene should mimic the native expression. The native promoter may be used when expression of the transgene must be regulated temporally or developmentally, or in a tissue-specific manner, or in response to specific transcriptional stimuli. In a further embodiment, other native expression control elements, such as enhancer elements, polyadenylation sites or Kozak consensus sequences may also be used to mimic the native expression.

In some embodiments, the regulatory sequences impart tissue-specific gene expression capabilities. In some cases, the tissue-specific regulatory sequences bind tissue-specific transcription factors that induce transcription in a tissue specific manner. Such tissue-specific regulatory sequences (e.g., promoters, enhancers, etc.) are well known in the art. Exemplary tissue-specific regulatory sequences include, but are not limited to the following tissue specific promoters:

retinoschisin proximal promoter, interphotoreceptor retinoid-binding protein enhancer (RS/IRBPa), rhodopsin kinase (RK), liver-specific thyroxin binding globulin (TBG) promoter, an insulin promoter, a glucagon promoter, a somatostatin promoter, a pancreatic polypeptide (PPY) promoter, a synapsin-1 (Syn) promoter, a creatine kinase (MCK) promoter, a mammalian desmin (DES) promoter, a α-myosin heavy chain (α-MHC) promoter, or a cardiac Troponin T (cTnT) promoter. Other exemplary promoters include Beta-actin promoter, hepatitis B virus core promoter, Sandig et al., Gene Ther., 3:1002-9 (1996); alpha-fetoprotein (AFP) promoter, Arbuthnot et al., Hum. Gene Ther., 7:1503-14 (1996)), bone osteocalcin promoter (Stein et al., Mol. Biol. Rep., 24:185-96 (1997)); bone sialoprotein promoter (Chen et al., J. Bone Miner. Res., 11:654-64 (1996)), CD2 promoter (Hansal et al., J. Immunol., 161:1063-8 (1998); immunoglobulin heavy chain promoter; T cell receptor α-chain promoter, neuronal such as neuron-specific enolase (NSE) promoter (Andersen et al., Cell. Mol. Neurobiol., 13:503-15 (1993)), neurofilament light-chain gene promoter (Piccioli et al., Proc. Natl. Acad. Sci. USA, 88:5611-5 (1991)), and the neuron-specific vgf gene promoter (Piccioli et al., Neuron, 15:373-84 (1995)), among others which will be apparent to the skilled artisan.

In some aspects, the disclosure relates to isolated nucleic acids comprising a transgene encoding a multi-gRNA expression cassette, and one or more miRNA binding sites. Without wishing to be bound by any particular theory, incorporation of miRNA binding sites into gene expression constructs allows for regulation of transgene expression (e.g., inhibition of transgene expression) in cells and tissues where the corresponding miRNA is expressed. In some embodiments, incorporation of one or more miRNA binding sites into a transgene allows for de-targeting of transgene expression in a cell-type specific manner. In some embodiments, one or more miRNA binding sites are positioned in a 3' untranslated region (3' UTR) of a transgene, for example between the last codon of a nucleic acid sequence encoding a Cas13 protein or a multi-gRNA expression cassette, and a poly A sequence.

In some embodiments, a transgene comprises one or more (e.g., 1, 2, 3, 4, 5, or more) miRNA binding sites that de-target expression of the RGN or the multi-gRNA expression cassette from central nervous system (CNS) cells, such as neurons. In some embodiments, a transgene comprises one or more (e.g., 1, 2, 3, 4, 5, or more) miRNA binding sites that de-target expression of the RGN or the multi-gRNA expression cassette from liver cells.

In some embodiments, a transgene comprises one or more (e.g., 1, 2, 3, 4, 5, or more) miRNA binding sites that de-target expression of the RGN or the multi-gRNA expression cassette from immune cells (e.g., antigen presenting cells (APCs), such as macrophages, dendrites, etc.). Incorporation of miRNA binding sites for immune-associated miRNAs may de-target transgene expression from antigen presenting cells and thus reduce or eliminate immune responses (cellular and/or humoral) produced in the subject against products of the transgene, for example as described in US 2018/0066279, the entire contents of which are incorporated herein by reference.

As used herein an "immune-associated miRNA" is an miRNA preferentially expressed in a cell of the immune system, such as an antigen presenting cell (APC). In some embodiments, an immune-associated miRNA is an miRNA expressed in immune cells that exhibits at least a 2-fold, 3-fold, 4-fold, 5-fold, 6-fold, 7-fold, 8-fold, 9-fold, 10-fold higher level of expression in an immune cell compared with a non-immune cell (e.g., a control cell, such as a HeLa cell, HEK293 cell, mesenchymal cell, etc.). In some embodiments, the cell of the immune system (immune cell) in which the immune-associated miRNA is expressed is a B cell, T cell, Killer T cell, Helper T cell, y& T cell, dendritic cell, macrophage, monocyte, vascular endothelial cell. or other immune cell. In some embodiments, the cell of the immune system is a B cell expressing one or more of the following markers: B220, BLAST-2 (EBVCS), Bu-1, CD19, CD20 (L26), CD22, CD24, CD27, CD57, CD72, CD79a, CD79b, CD86, chB6, D8/17, FMC7, L26, M17, MUM-1, Pax-5 (BSAP), and PC47H. In some embodiments, the cell of the immune system is a T cell expressing one or more of the following markers: ART2, CD1a, CD1d, CD11b (Mac-1), CD134 (OX40), CD150, CD2, CD25 (interleukin 2 receptor alpha), CD3, CD38, CD4, CD45RO, CD5, CD7, CD72, CD8, CRTAM, FOXP3, FT2, GPCA, HLA-DR, HML-1, HT23A, Leu-22, Ly-2, Ly-m22, MICG, MRC OX 8, MRC OX-22, OX40, PD-1 (Programmed death-1), RT6, TCR (T cell receptor), Thy-1 (CD90), and TSA-2 (Thymic shared Ag-2). In some embodiments, the immune-associated miRNA is selected from: miR-15a, miR-16-1, miR-17, miR-18a, miR-19a, miR-19b-1, miR-20a, miR-21, miR-29a/b/c, miR-30b, miR-31, miR-34a, miR-92a-1, miR-106a, miR-125a/b, miR-142-3p, miR-146a, miR-150, miR-155, miR-181a, miR-223 and miR-424, miR-221, miR-222, let-7i, miR-148, and miR-152.

The isolated nucleic acids of the disclosure may be recombinant adeno-associated virus (AAV) vectors (rAAV vectors). In some embodiments, an isolated nucleic acid as described by the disclosure comprises a region (e.g., a first region) comprising a first adeno-associated virus (AAV) inverted terminal repeat (ITR), or a variant thereof. The isolated nucleic acid (e.g., the recombinant AAV vector) may be packaged into a capsid protein and administered to a subject and/or delivered to a selected target cell. "Recombinant AAV (rAAV) vectors" are typically composed of, at a minimum, a transgene and its regulatory sequences, and 5' and 3' AAV inverted terminal repeats (ITRs). The transgene may comprise a region encoding, for example, a protein and/or an expression control sequence (e.g., a poly-A tail), as described elsewhere in the disclosure.

Generally, ITR sequences are about 145 bp in length. Preferably, substantially the entire sequences encoding the ITRs are used in the molecule, although some degree of minor modification of these sequences is permissible. The ability to modify these ITR sequences is within the skill of the art. (See, e.g., texts such as Sambrook et al., "Molecular Cloning. A Laboratory Manual", 2d ed., Cold Spring Harbor Laboratory, New York (1989); and K. Fisher et al., J Virol., 70:520 532 (1996)). An example of such a molecule employed in the disclosure is a "cis-acting" plasmid containing the transgene, in which the selected transgene sequence and associated regulatory elements are flanked by the 5' and 3' AAV ITR sequences. The AAV ITR sequences may be obtained from any known AAV, including presently identified mammalian AAV types. In some embodiments, the isolated nucleic acid further comprises a region (e.g., a second region, a third region, a fourth region, etc.) comprising a second AAV ITR. In some embodiments, an isolated nucleic acid encoding a transgene is flanked by AAV ITRs (e.g., in the orientation 5'-ITR-transgene-ITR-3'). In some embodiments, the AAV ITRs are AAV2 ITRs. In some embodiments, at least one of the AAV ITRs is a ΔITR, which lacks a terminal resolution site and induces formation of a self-complementary AAV (scAAV) vector.

Recombinant Adeno-Associated Viruses (rAAVs) and Other Vectors

Aspects of the disclosure relate to vectors comprising an isolated nucleic acid encoding RGNs and multi-gRNA expression cassettes. In some embodiments, an RGN and a multi-gRNA are encoded by a single isolated nucleic acid. In some embodiments, an RGN is encoded by a vector and a multi-gRNA is encoded by a second (e.g., separate) vector. As used herein, the term "vector" includes any genetic element, such as a plasmid, phage, transposon, cosmid, chromosome, artificial chromosome, virus, virion, etc., which is capable of replication when associated with the proper control elements and which can transfer gene sequences between cells. In some embodiments, a vector is a viral vector, such as an rAAV vector, a lentiviral vector, an adenoviral vector, a retroviral vector, etc. Thus, the term includes cloning and expression vehicles, as well as viral vectors. In some embodiments, useful vectors are contemplated to be those vectors in which the nucleic acid segment to be transcribed is positioned under the transcriptional control of a promoter.

In some aspects, the disclosure provides isolated adeno-associated viruses (AAVs). As used herein with respect to AAVs, the term "isolated" refers to an AAV that has been artificially produced or obtained. Isolated AAVs may be produced using recombinant methods. Such AAVs are referred to herein as "recombinant AAVs". Recombinant AAVs (rAAVs) preferably have tissue-specific targeting capabilities, such that a transgene of the rAAV will be delivered specifically to one or more predetermined tissue(s) (e.g., ocular tissues, neurons, liver, etc.). The AAV capsid is an important element in determining these tissue-specific targeting capabilities (e.g., tissue tropism). Thus, an rAAV having a capsid appropriate for the tissue being targeted can be selected.

Methods for obtaining recombinant AAVs having a desired capsid protein are well known in the art. (See, for example, US 2003/0138772), the contents of which are incorporated herein by reference in their entirety). Typically the methods involve culturing a host cell which contains a nucleic acid sequence encoding an AAV capsid protein; a functional rep gene; a recombinant AAV vector composed of AAV inverted terminal repeats (ITRs) and a transgene; and sufficient helper functions to permit packaging of the recombinant AAV vector into the AAV capsid proteins. In some embodiments, capsid proteins are structural proteins encoded by the cap gene of an AAV. AAVs comprise three capsid proteins, virion proteins 1 to 3 (named VP1, VP2 and VP3), all of which are transcribed from a single cap gene via alternative splicing. In some embodiments, the molecular weights of VP1, VP2 and VP3 are respectively about 87 kDa, about 72 kDa and about 62 kDa. In some embodiments, upon translation, capsid proteins form a spherical 60-mer protein shell around the viral genome. In some embodiments, the functions of the capsid proteins are to protect the viral genome, deliver the genome and interact with the host. In some aspects, capsid proteins deliver the viral genome to a host in a tissue specific manner.

In some embodiments, an AAV capsid protein has a tropism for liver tissue (e.g., hepatocytes, etc.). In some embodiments, an AAV capsid protein does not target neuronal cells. In some embodiments, an AAV capsid protein does not cross the blood-brain barrier (BBB).

In some embodiments, an AAV capsid protein is of an AAV serotype selected from the group consisting of AAV1, AAV2, AAV3, AAV4, AAV5, AAV6, AAV7, AAV8, AAV9, AAV9.hr, AAVrh8, AAVrh10, AAVrh39, AAVrh43, AAV.PHP.B, AAV.PHP.eB, and variants of any of the foregoing. In some embodiments, an AAV capsid protein is of a serotype derived from a non-human primate, for example AAVrh8 serotype. In some embodiments, the AAV capsid protein is an AAV8 capsid protein.

In some embodiments, an rAAV vector or rAAV particle comprises a mutant ITR that lacks a functional terminal resolution site (TRS). The term "lacking a terminal resolution site" can refer to an AAV ITR that comprises a mutation (e.g., a sense mutation such as a non-synonymous mutation, or missense mutation) that abrogates the function of the terminal resolution site (TRS) of the ITR, or to a truncated AAV ITR that lacks a nucleic acid sequence encoding a functional TRS (e.g., a ΔTRS ITR). Without wishing to be bound by any particular theory, a rAAV vector comprising an ITR lacking a functional TRS produces a self-complementary rAAV vector, for example as described by McCarthy (2008) Molecular Therapy 16 (10): 1648-1656.

The components to be cultured in the host cell to package a rAAV vector in an AAV capsid may be provided to the host cell in trans. Alternatively, any one or more of the required components (e.g., recombinant AAV vector, rep sequences, cap sequences, and/or helper functions) may be provided by a stable host cell which has been engineered to contain one or more of the required components using methods known to those of skill in the art. Most suitably, such a stable host cell will contain the required component(s) under the control of an inducible promoter. However, the required component(s) may be under the control of a constitutive promoter. Examples of suitable inducible and constitutive promoters are provided herein, in the discussion of regulatory elements suitable for use with the transgene. In still another alternative, a selected stable host cell may contain selected component(s) under the control of a constitutive promoter and other selected component(s) under the control of one or more inducible promoters. For example, a stable host cell may be generated which is derived from 293 cells (which contain E1 helper functions under the control of a constitutive promoter), but which contain the rep and/or cap proteins under the control of inducible promoters. Still other stable host cells may be generated by one of skill in the art.

In some embodiments, the disclosure relates to a host cell containing a nucleic acid that comprises a coding sequence encoding a transgene (e.g., a RGN and/or a multi-gRNA expression cassette). A "host cell" refers to any cell that harbors, or is capable of harboring, a substance of interest. Often a host cell is a mammalian cell. In some embodiments, a host cell is a neuron. In some embodiments, a host cell is a photoreceptor cell. A host cell may be used as a recipient of an AAV helper construct, an AAV minigene plasmid, an accessory function vector, or other transfer DNA associated with the production of recombinant AAVs. The term includes the progeny of the original cell which has been transfected. Thus, a "host cell" as used herein may refer to a cell which has been transfected with an exogenous DNA sequence. It is understood that the progeny of a single parental cell may not necessarily be completely identical in morphology or in genomic or total DNA complement as the original parent, due to natural, accidental, or deliberate mutation. In some embodiments, the host cell is a mammalian cell, a yeast cell, a bacterial cell, an insect cell, a plant cell, or a fungal cell. In some embodiments, the host cell is a hepatocyte.

The recombinant AAV vector, rep sequences, cap sequences, and helper functions required for producing the rAAV of the disclosure may be delivered to the packaging host cell using any appropriate genetic element (vector). The selected genetic element may be delivered by any suitable method, including those described herein. The methods used to construct any embodiment of this disclosure are known to those with skill in nucleic acid manipulation and include genetic engineering, recombinant engineering, and synthetic techniques. See, e.g., Sambrook et al., Molecular Cloning: A Laboratory Manual, Cold Spring Harbor Press, Cold Spring Harbor, N.Y. Similarly, methods of generating rAAV virions are well known and the selection of a suitable method is not a limitation on the disclosure. See, e.g., K. Fisher et al., J. Virol., 70:520-532 (1993) and U.S. Pat. No. 5,478,745.

In some embodiments, recombinant AAVs may be produced using the triple transfection method (described in detail in U.S. Pat. No. 6,001,650). Typically, the recombinant AAVs are produced by transfecting a host cell with an AAV vector (comprising a transgene flanked by ITR elements) to be packaged into AAV particles, an AAV helper function vector, and an accessory function vector. An AAV helper function vector encodes the "AAV helper function" sequences (e.g., rep and cap), which function in trans for productive AAV replication and encapsidation. Preferably, the AAV helper function vector supports efficient AAV vector production without generating any detectable wild-type AAV virions (e.g., AAV virions containing functional rep and cap genes). Non-limiting examples of vectors suitable for use with the disclosure include pHLP19, described in U.S. Pat. No. 6,001,650 and pRep6cap6 vector, described in U.S. Pat. No. 6,156,303, the entirety of both incorporated by reference herein. The accessory function vector encodes nucleotide sequences for non-AAV derived viral and/or cellular functions upon which AAV is dependent for replication (e.g., "accessory functions"). The accessory functions include those functions required for AAV replication, including, without limitation, those moieties involved in activation of AAV gene transcription, stage specific AAV mRNA splicing, AAV DNA replication, synthesis of cap expression products, and AAV capsid assembly. Viral-based accessory functions can be derived from any of the known helper viruses such as adenovirus, herpes virus (other than herpes simplex virus type-1), and vaccinia virus.

In some aspects, the disclosure provides transfected host cells. The term "transfection" is used to refer to the uptake of foreign DNA by a cell, and a cell has been "transfected" when exogenous DNA has been introduced inside the cell membrane. A number of transfection techniques are generally known in the art. See, e.g., Graham et al. (1973) Virology, 52:456, Sambrook et al. (1989) Molecular Cloning, a laboratory manual, Cold Spring Harbor Laboratories, New York, Davis et al. (1986) Basic Methods in Molecular Biology, Elsevier, and Chu et al. (1981) Gene 13:197. Such techniques can be used to introduce one or more exogenous nucleic acids, such as a nucleotide integration vector and other nucleic acid molecules, into suitable host cells.

As used herein, the terms "recombinant cell" refers to a cell into which an exogenous DNA segment, such as DNA segment that leads to the transcription of a biologically-active polypeptide or production of a biologically active nucleic acid such as an RNA, has been introduced.

Methods

Methods for delivering a transgene (e.g., an isolated nucleic acid encoding a RGN and/or a multi-gRNA expression cassette) to a subject are provided by the disclosure. The methods typically involve administering to a subject an effective amount of an isolated nucleic acid encoding the transgene(s). In some embodiments, expression constructs described by the disclosure are useful for treating diseases associated with hypercholesterolemia or dyslipidemia. Examples of diseases and conditions associated with hypercholesterolemia or dyslipidemia include but are not limited to high cholesterol, atherosclerosis, heart attack, stroke, In some aspects the disclosure relates to a method of treating hypercholesterolemia or dyslipidemia in a subject, the method comprising administering to a subject in need thereof an effective amount of an isolated nucleic acid or an rAAV as described herein. A subject may be any mammalian organism, for example a human, non-human primate, horse, pig, dog, cat rodent, etc. In some embodiments a subject is a human.

An "effective amount" of a substance is an amount sufficient to produce a desired effect. In some embodiments, an effective amount of an isolated nucleic acid is an amount sufficient to transfect (or infect in the context of rAAV mediated delivery) a sufficient number of target cells of a target tissue of a subject. In some embodiments, a target tissue is liver tissue (e.g., hepatocytes, etc.). In some embodiments, an effective amount of an isolated nucleic acid (e.g., which may be delivered via an rAAV) may be an amount sufficient to have a therapeutic benefit in a subject, e.g., to decrease the expression of one or more genes associated with hypercholesterolemia (e.g., PSCK9, ANGPTL3, APOB, etc.), to extend the lifespan of a subject, to improve in the subject one or more symptoms of disease (e.g., a symptom of hypercholesterolemia or dyslipidemia), etc. The effective amount will depend on a variety of factors such as, for example, the species, age, weight, health of the subject, and the tissue to be targeted, and may thus vary among subject and tissue as described elsewhere in the disclosure.

As used herein, the term "treating" refers to the application or administration of a composition encoding a transgene (s) to a subject, who has hypercholesterolemia or dyslipidemia, a symptom of hypercholesterolemia or dyslipidemia, or a predisposition toward hypercholesterolemia or dyslipidemia (e.g., one or more mutations in a gene selected from PSCK9, ANGPTL3, APOB, etc.), with the purpose to cure, heal, alleviate, relieve, alter, remedy, ameliorate, improve, or affect the disorder, the symptom of the disease, or the predisposition toward hypercholesterolemia or dyslipidemia.

Alleviating hypercholesterolemia or dyslipidemia includes delaying the development or progression of the disease, or reducing disease severity. Alleviating the disease does not necessarily require curative results. As used therein, "delaying" the development of a disease (such as hypercholesterolemia or dyslipidemia) means to defer, hinder, slow, retard, stabilize, and/or postpone progression of the disease. This delay can be of varying lengths of time, depending on the history of the disease and/or individuals being treated. A method that "delays" or alleviates the development of a disease, or delays the onset of the disease, is a method that reduces probability of developing one or more symptoms of the disease in a given time frame and/or reduces extent of the symptoms in a given time frame, when compared to not using the method. Such comparisons are typically based on clinical studies, using a number of subjects sufficient to give a statistically significant result.

"Development" or "progression" of a disease means initial manifestations and/or ensuing progression of the disease. Development of the disease can be detectable and assessed using standard clinical techniques as well known in the art. However, development also refers to progression that may be undetectable. For purpose of this disclosure, development or progression refers to the biological course of the symptoms. "Development" includes occurrence, recurrence, and onset. As used herein "onset" or "occurrence" of hypercholesterolemia or dyslipidemia includes initial onset and/or recurrence.

In some embodiments, administration occurs via systemic injection or direct injection to the liver. In some embodiments, systemic injection is intravenous injection. In some embodiments, direct injection is intraparenchymal injection, intrahepatic injection (e.g., hepatic portal vein injection, etc.).

Administration

The isolated nucleic acids and rAAVs of the disclosure may be delivered to a subject in compositions according to any appropriate methods known in the art. For example, an rAAV, preferably suspended in a physiologically compatible carrier (i.e., in a composition), may be administered to a subject, i.e. host animal, such as a human, mouse, rat, cat, dog, sheep, rabbit, horse, cow, goat, pig, guinea pig, hamster, chicken, turkey, or a non-human primate (e.g., Macaque). In some embodiments a host animal does not include a human. Delivery of the rAAVs to a mammalian subject may be by, for example, intramuscular injection or by administration into the bloodstream of the mammalian subject. Administration into the bloodstream may be by injection into a vein, an artery, or any other vascular conduit. In some embodiments, the rAAVs are administered into the bloodstream by way of isolated limb perfusion, a technique well known in the surgical arts, the method essentially enabling the artisan to isolate a limb from the systemic circulation prior to administration of the rAAV virions. A variant of the isolated limb perfusion technique, described in U.S. Pat. No. 6,177,403, can also be employed by the skilled artisan to administer the virions into the vasculature of an isolated limb to potentially enhance transduction into muscle cells or tissue.

The compositions of the disclosure may comprise an rAAV alone, or in combination with one or more other viruses (e.g., a second rAAV encoding having one or more different transgenes). In some embodiments, a composition comprises 1, 2, 3, 4, 5, 6, 7, 8, 9, 10, or more different rAAVs each having one or more different transgenes.

Suitable carriers may be readily selected by one of skill in the art in view of the indication for which the rAAV is directed. For example, one suitable carrier includes saline, which may be formulated with a variety of buffering solutions (e.g., phosphate buffered saline). Other exemplary carriers include sterile saline, lactose, sucrose, calcium phosphate, gelatin, dextran, agar, pectin, peanut oil, sesame oil, and water. The selection of the carrier is not a limitation of the present disclosure.

Optionally, the compositions of the disclosure may contain, in addition to the rAAV and carrier(s), other conventional pharmaceutical ingredients, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, and parachlorophenol. Suitable chemical stabilizers include gelatin and albumin.

The rAAVs are administered in sufficient amounts to transfect the cells of a desired tissue and to provide sufficient levels of gene transfer and expression without undue adverse effects. Conventional and pharmaceutically acceptable routes of administration include, but are not limited to, direct delivery to the selected organ (e.g., intraportal delivery to the liver), oral, inhalation (including intranasal and intratracheal delivery), intraocular, intravenous, intracerebroventricular, intramuscular, subcutaneous, intradermal, intratumoral, and other parental routes of administration. Routes of administration may be combined, if desired.

The dose of rAAV virions required to achieve a particular "therapeutic effect," e.g., the units of dose in genome copies/per kilogram of body weight (GC/kg), will vary based on several factors including, but not limited to: the route of rAAV virion administration, the level of gene or RNA expression required to achieve a therapeutic effect, the specific disease or disorder being treated, and the stability of the gene or RNA product. One of skill in the art can readily determine a rAAV virion dose range to treat a patient having a particular disease or disorder based on the aforementioned factors, as well as other factors that are well known in the art.

An effective amount of an rAAV is an amount sufficient to target infect an animal, target a desired tissue. In some embodiments, an effective amount of an rAAV is an amount sufficient to produce a stable somatic transgenic animal model. The effective amount will depend primarily on factors such as the species, age, weight, health of the subject, and the tissue to be targeted, and may thus vary among animal and tissue. For example, an effective amount of the rAAV is generally in the range of from about 1 ml to about 100 ml of solution containing from about $10^9$ to $10^{16}$ genome copies. In some cases, a dosage between about $10^{11}$ to $10^{13}$ rAAV genome copies is appropriate. In certain embodiments, $10^{12}$ or $10^{13}$ rAAV genome copies is effective to target CNS tissue. In some cases, stable transgenic animals are produced by multiple doses of an rAAV.

In some embodiments, a dose of rAAV is administered to a subject no more than once per calendar day (e.g., a 24-hour period). In some embodiments, a dose of rAAV is administered to a subject no more than once per 2, 3, 4, 5, 6, or 7 calendar days. In some embodiments, a dose of rAAV is administered to a subject no more than once per calendar week (e.g., 7 calendar days). In some embodiments, a dose of rAAV is administered to a subject no more than bi-weekly (e.g., once in a two calendar week period). In some embodiments, a dose of rAAV is administered to a subject no more than once per calendar month (e.g., once in 30 calendar days). In some embodiments, a dose of rAAV is administered to a subject no more than once per six calendar months. In some embodiments, a dose of rAAV is administered to a subject no more than once per calendar year (e.g., 365 days or 366 days in a leap year).

In some embodiments, rAAV compositions are formulated to reduce aggregation of AAV particles in the composition, particularly where high rAAV concentrations are present (e.g., ~$10^{13}$ GC/ml or more). Methods for reducing aggregation of rAAVs are well known in the art and, include, for example, addition of surfactants, pH adjustment, salt concentration adjustment, etc. (See, e.g., Wright F R, et al., Molecular Therapy (2005) 12, 171-178, the contents of which are incorporated herein by reference.)

Formulation of pharmaceutically-acceptable excipients and carrier solutions is well-known to those of skill in the art, as is the development of suitable dosing and treatment regimens for using the particular compositions described herein in a variety of treatment regimens.

Typically, these formulations may contain at least about 0.1% of the active compound or more, although the percentage of the active ingredient(s) may, of course, be varied and may conveniently be between about 1 or 2% and about 70% or 80% or more of the weight or volume of the total formulation. Naturally, the amount of active compound in each therapeutically-useful composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

In certain circumstances it will be desirable to deliver the rAAV-based therapeutic constructs in suitably formulated pharmaceutical compositions disclosed herein either subcutaneously, intraopancreatically, intranasally, parenterally, intravenously, intramuscularly, intrathecally, or orally, intraperitoneally, or by inhalation. In some embodiments, the administration modalities as described in U.S. Pat. Nos. 5,543,158; 5,641,515 and 5,399,363 (each specifically incorporated herein by reference in its entirety) may be used to deliver rAAVs. In some embodiments, a preferred mode of administration is by portal vein injection.

The pharmaceutical forms suitable for injectable use include sterile aqueous solutions or dispersions and sterile powders for the extemporaneous preparation of sterile injectable solutions or dispersions. Dispersions may also be prepared in glycerol, liquid polyethylene glycols, and mixtures thereof and in oils. Under ordinary conditions of storage and use, these preparations contain a preservative to prevent the growth of microorganisms. In many cases the form is sterile and fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For administration of an injectable aqueous solution, for example, the solution may be suitably buffered, if necessary, and the liquid diluent first rendered isotonic with sufficient saline or glucose. These particular aqueous solutions are especially suitable for intravenous, intramuscular, subcutaneous and intraperitoneal administration. In this connection, a sterile aqueous medium that can be employed will be known to those of skill in the art. For example, one dosage may be dissolved in 1 ml of isotonic NaCl solution and either added to 1000 ml of hypodermoclysis fluid or injected at the proposed site of infusion, (see for example, "Remington's Pharmaceutical Sciences" 15th Edition, pages 1035-1038 and 1570-1580). Some variation in dosage will necessarily occur depending on the condition of the host. The person responsible for administration will, in any event, determine the appropriate dose for the individual host.

Sterile injectable solutions are prepared by incorporating the active rAAV in the required amount in the appropriate solvent with various of the other ingredients enumerated herein, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

The rAAV compositions disclosed herein may also be formulated in a neutral or salt form. Pharmaceutically-acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The formulations are easily administered in a variety of dosage forms such as injectable solutions, drug-release capsules, and the like.

As used herein, "carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Supplementary active ingredients can also be incorporated into the compositions. The phrase "pharmaceutically-acceptable" refers to molecular entities and compositions that do not produce an allergic or similar untoward reaction when administered to a host.

Delivery vehicles such as liposomes, nanocapsules, microparticles, microspheres, lipid particles, vesicles, and the like, may be used for the introduction of the compositions of the present disclosure into suitable host cells. In particular, the rAAV vector delivered transgenes may be formulated for delivery either encapsulated in a lipid particle, a liposome, a vesicle, a nanosphere, or a nanoparticle or the like.

Such formulations may be preferred for the introduction of pharmaceutically acceptable formulations of the nucleic acids or the rAAV constructs disclosed herein. The formation and use of liposomes is generally known to those of skill in the art. Recently, liposomes were developed with improved serum stability and circulation half-times (U.S. Pat. No. 5,741,516). Further, various methods of liposome and liposome like preparations as potential drug carriers have been described (U.S. Pat. Nos. 5,567,434; 5,552,157; 5,565,213; 5,738,868 and 5,795,587).

Liposomes have been used successfully with a number of cell types that are normally resistant to transfection by other procedures. In addition, liposomes are free of the DNA length constraints that are typical of viral-based delivery systems. Liposomes have been used effectively to introduce genes, drugs, radiotherapeutic agents, viruses, transcription factors and allosteric effectors into a variety of cultured cell lines and animals. In addition, several successful clinical trials examining the effectiveness of liposome-mediated drug delivery have been completed.

Liposomes are formed from phospholipids that are dispersed in an aqueous medium and spontaneously form multilamellar concentric bilayer vesicles (also termed multilamellar vesicles (MLVs). MLVs generally have diameters of from 25 nm to 4 µm. Sonication of MLVs results in the formation of small unilamellar vesicles (SUVs) with diameters in the range of 200 to 500 Å, containing an aqueous solution in the core.

Alternatively, nanocapsule formulations of the rAAV may be used. Nanocapsules can generally entrap substances in a stable and reproducible way. To avoid side effects due to intracellular polymeric overloading, such ultrafine particles (sized around 0.1 µm) should be designed using polymers able to be degraded in vivo. Biodegradable polyalkyl-cyanoacrylate nanoparticles that meet these requirements are contemplated for use. In addition to the methods of delivery described above, the following techniques are also contemplated as alternative methods of delivering the rAAV compositions to a host. Sonophoresis (i.e., ultrasound) has been used and described in U.S. Pat. No. 5,656,016 as a device for enhancing the rate and efficacy of drug permeation into and through the circulatory system. Other drug delivery alternatives contemplated are intraosseous injection (U.S. Pat. No. 5,779,708), microchip devices (U.S. Pat. No. 5,797,898), ophthalmic formulations (Bourlais et al., 1998), transdermal matrices (U.S. Pat. Nos. 5,770,219 and 5,783,208) and feedback-controlled delivery (U.S. Pat. No. 5,697,899).

EXAMPLES

This Example describes single-vector AAV constructs for multiplexed knockdown of mRNA, for example PCSK9 and another potential therapeutic hypercholesterolemia targets, such as ANGPTL3 and APOB.

Isolated nucleic acids and rAAVs described herein are useful, in some embodiments, for delivery of a RNA-guided nuclease (e.g., a Cas13 nuclease, such as CasRx), in combination with multi-gRNA expression cassettes which mediate RNAi-based gene therapy to target hypercholesterolemia and other dyslipidemias. The rAAV vectors and rAAVs described herein have the following architecture:

5'ITR-U6 promoter-multi guide cassette-CB6 promoter-CasRx-polyA-3'ITR

In some embodiments, the multi-gRNA expression cassette has the following architecture (guide sequence$_1$ and guide sequence$_2$ may be the same guide sequence or different guide sequences):

$DR_{30}$-[guide sequence$_1$-$DR_{36}$-guide sequence$_2$-$DR_{36}$]$_n$-T

Expression from a single U6 promoter enables the multi-guide transcript to be processed by CasRx into individual guides, as the intervening 36-base direct repeats ($DR_{36}$) dictate. The vectors utilize an initial DR of 30 bases ($DR_{30}$, reflective of the "mature" or processed guide sequence) followed by a seed/targeting sequence, then a 36-base DR and additional seed sequence. These vectors have consistently achieved knockdown of target mRNA, as assessed by reporter plasmid assay, in excess of 90% (FIG. 1).

Figure 2:
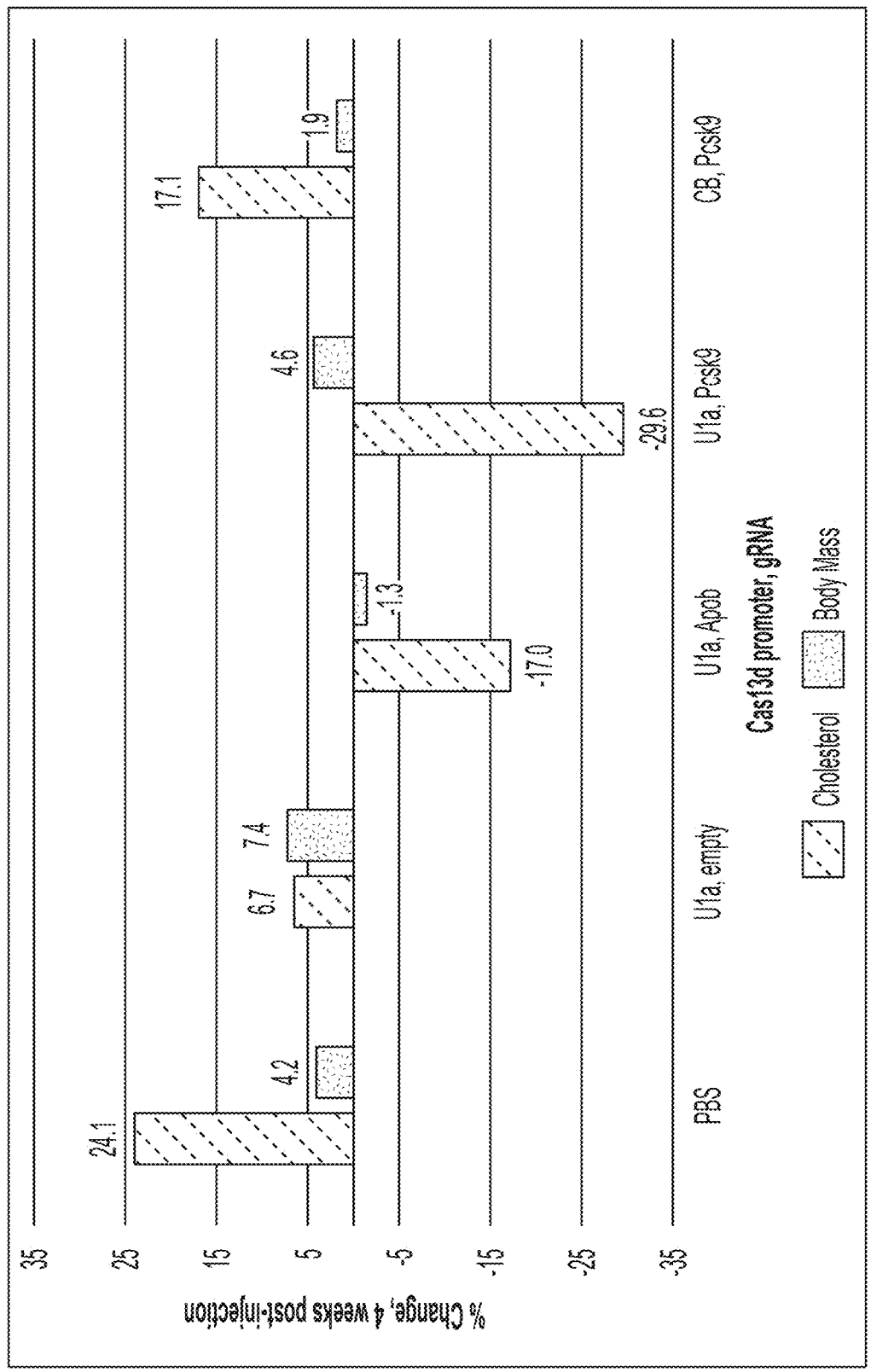
FIG. 2 shows overall 4-week change in body mass and total cholesterol, expressed as a percentage of day 0 values. Data indicate the Ula-Cas13d PCSK9 gRNA vector resulted in a significant drop in total cholesterol of 30% (statistics: Two-way student t-test; p-value=0.04219), compared to the PBS control, and the Apob-targeting Ula-driven C13d vector resulted in an average reduction of 17% for total cholesterol (p-value=0.1524), and a statistically significant loss of body mass (1.3% over 4 weeks).

Following positive results from reporter assays in cell lines, constitutive CB6 and U1a Cas13d vectors were investigated for their potential to lower cholesterol in healthy adult male mice. Apob and Pcsk9 were selected as single gene targets for these studies. PBS injected animals and a Cas13d/non-targeting sgRNA vector injected animals were used as control groups. The mice were injected at 4-6 weeks of age and body mass was measured weekly. Serum was collected on day 0, 14, and 28 for total cholesterol by colorimetric assay (Cell Biolabs Inc.) The overall 4-week change in body mass and total cholesterol, expressed as a percentage of day 0 values, are depicted in FIG. 2. The results showed the U1a-Cas13d Pcsk9 gRNA vector resulted in a significant drop in total cholesterol of 30% (Statistics: Two-way student t-test; p-value=0.04219), compared to the PBS control. The Apob-targeting U1a-driven C13d vector resulted in an average reduction of 17% for total cholesterol (p-value=0.1524) and a statistically significant loss of body mass (1.3% over 4 weeks).

SEQUENCE LISTING

The contents of the text file submitted electronically herewith are incorporated herein by reference in their entirety: A computer readable format copy of the Sequence Listing (filename: U0120.70116WO00-SEQ.txt, date recorded: Apr. 10, 2019, file size ~ 747,668 bytes).

The sequence listing includes the sequences as set forth in SEQ ID NO: 1-58 as described above, and the following rAAV vector sequences:

| | |
|---|---|
| pABG117 pmiCHECKApob1T | (SEQ ID NO: 59) |
| pABG122 pmiCHECKmPcsk9 | (SEQ ID NO: 60) |
| pABG143 pXR001 | (SEQ ID NO: 61) |
| pABG144 pXR002 | (SEQ ID NO: 62) |
| pABG145 pXR003_v2 | (SEQ ID NO: 63) |
| pABG146 pXR004_v2 | (SEQ ID NO: 64) |
| pABG152 mPcsk9 C13d sgRNA 1 | (SEQ ID NO: 65) |
| pABG153 mPcsk9 C13d sgRNA 2 | (SEQ ID NO: 66) |
| pABG154 mPcsk9 C13d sgRNA 3 | (SEQ ID NO: 67) |
| pABG155 mApob C13d sgRNA 2 | (SEQ ID NO: 68) |

-continued

| | |
|---|---|
| pABG156 mApob C13d sgRNA 3 | (SEQ ID NO: 69) |
| pABG180 pAAV ula-Cas13d hU6-DR30-BbsI sgRNA | (SEQ ID NO: 70) |
| pABG181 pAAV ula-Cas13d hU6-DR30-mApob.3 sgRNA | (SEQ ID NO: 71) |
| pABG182 pAAV ula-Cas13d hU6-DR30-mPcsk9.2 sgRNA | (SEQ ID NO: 72) |
| pABG183 pAAV CMV-Cas13d hU6-DR30-BbsI sgRNA | (SEQ ID NO: 73) |
| pABG184 pAAV ula-Cas13d hU6-DR30-BbsI-DR36-BsmbI sgRNA | (SEQ ID NO: 74) |
| pABG185 pAAV ula-Cas13d hU6-DR30-mApoB.3n30 sgRNA | (SEQ ID NO: 75) |
| pABG186 pAAV ula-Cas13d hU6-DR30-mPcsk9.2n30 sgRNA | (SEQ ID NO: 76) |
| pABG187 pAAV ula-Cas13d hU6-DR30-mApob.3n30-DR36-BsmbI sgRNA | (SEQ ID NO: 77) |
| pABG188 pAAV ula-Cas13d hU6-DR30-mPcsk9.2n30-DR36-BsmbI sgRNA | (SEQ ID NO: 78) |
| pABG189 pAAV ula-Cas13d hU6-DR30-BbsI-DR36-mApob.3n30 sgRNA | (SEQ ID NO: 79) |
| pABG190 pAAV ula-Cas13d hU6-DR30-BbsI-DR36-mPcsk9.2n30 sgRNA | (SEQ ID NO: 80) |
| pABG191 pAAV ula-Cas13d hU6-DR30-mApob.3-DR36-mPcsk9.2 sgRNA | (SEQ ID NO: 81) |
| pABG192 pAAV ula-Cas13d hU6-DR30-mPcsk9.2 N30-DR36-mApoB.3 N30 sgRNA | (SEQ ID NO: 82) |
| pABG196 pAAV ula-Cas13d hU6-DR30-hmrGFAP.1 N30 sgRNA | (SEQ ID NO: 83) |
| pABG197 pAAV ula-Cas13d hU6-DR30-hmrGFAP.1 N30 sgRNA | (SEQ ID NO: 84) |
| pABG198 pAAV ula-Cas13d hU6-DR30-hmrGFAP.2 N24 sgRNA | (SEQ ID NO: 85) |
| pABG199 pAAV ula-Cas13d hU6-DR30-hmrGFAP.3 N24 sgRNA | (SEQ ID NO: 86) |
| pABG200 pAAV ula-Cas13d hU6-DR30-hmrGFAP.4 N24 sgRNA | (SEQ ID NO: 87) |
| pABG208 pAAV ula-NLS-Cas13d hU6-DR30-BbsI sgRNA | (SEQ ID NO: 88) |
| pABG212 pAAV CB6-Cas13d U6-empty sgRNA | (SEQ ID NO: 89) |
| pABG213 pAAV CB6-Cas13d U6-mApob.3 sgRNA | (SEQ ID NO: 90) |
| pABG214 pAAV CB6-Cas13d U6-mPcsk9.2 sgRNA | (SEQ ID NO: 91) |
| pABG215 pAAV ula-NLS-Cas13d hU6-DR30-mApob.3 sgRNA | (SEQ ID NO: 92) |
| pABG216 pAAV ula-NLS-Cas13d hU6-DR30-mPcsk9.2 sgRNA | (SEQ ID NO: 93) |
| pABG220 pAAV ula-NLS-Cas13d hU6-DR30-mApob.3 N30 sgRNA | (SEQ ID NO: 94) |
| pABG221 pAAV ula-NLS-Cas13d hU6-DR30-mPcsk9.2 N30 sgRNA | (SEQ ID NO: 95) |

| Plasmid | Description | SEQ ID NO |
|---|---|---|
| pABG222 | pAAV ula-NLS-Cas13d hU6-DR30-BbsI-DR36-BsaI sgRNA | (SEQ ID NO: 96) |
| pABG223 | pAAV ula-NLS-Cas13d hU6-DR30-mApob.3 N31-DR36-BsaI sgRNA | (SEQ ID NO: 97) |
| pABG224 | pAAV ula-NLS-Cas13d hU6-DR30-mPcsk9.2 N31-DR36-BsaI sgRNA | (SEQ ID NO: 98) |
| pABG225 | pAAV ula-NLS-Cas13d hU6-DR30-BbsI-DR36-mApob.3 N31 sgRNA | (SEQ ID NO: 99) |
| pABG226 | pAAV ula-NLS-Cas13d hU6-DR30-BbsI-DR36-mPcsk9.2 N31 sgRNA | (SEQ ID NO: 100) |
| pABG227 | pAAV ula-NLS-Cas13d hU6-DR30-BbsI-DR36-mPcsk9.2 sgRNA | (SEQ ID NO: 101) |
| pABG229 | pAAV ula-NLS-Cas13d hU6-DR30-hmrGFAP.1 sgRNA | (SEQ ID NO: 102) |
| pABG230 | pAAV ula-NLS-Cas13d hU6-DR30-hmrGFAP.3 sgRNA | (SEQ ID NO: 103) |
| pABG231 | pAAV ula-NLS-Cas13d hU6-DR30-mApob.3 N31-DR36-mPcsk9.2 sgRNA | (SEQ ID NO: 104) |
| pABG232 | pAAV ula-NLS-Cas13d hU6-DR30-mApob.3 N31-DR36-mPcsk9.2 N31 sgRNA | (SEQ ID NO: 105) |
| pABG233 | pAAV ula-NLS-Cas13d hU6-DR30-hmrGFAP.4 sgRNA | (SEQ ID NO: 106) |
| pABG234 | pAAV ula-NLS-Cas13d hU6-DR30-hmANGPTL3.1 sgRNA | (SEQ ID NO: 107) |
| pABG235 | pAAV ula-NLS-Cas13d hU6-DR30-hmANGPTL3.2 sgRNA | (SEQ ID NO: 108) |
| pABG236 | pAAV ula-NLS-Cas13d hU6-DR30-hmANGPTL3.3 sgRNA | (SEQ ID NO: 109) |
| pABG237 | pAAV ula-NLS-Cas13d hU6-DR30-hmANGPTL3.5 sgRNA | (SEQ ID NO: 110) |
| pABG238 | pAAV ula-NLS-Cas13d hU6-DR30-hmANGPTL3.6 sgRNA | (SEQ ID NO: 111) |
| pABG239 | pAAV ula-NLS-Cas13d hU6-DR30-hmANGPTL3.4 sgRNA | (SEQ ID NO: 112) |
| pABG241 | pAAV ula-NLS-Cas13d hU6-DR30-BbsI-DR36-mApob.3 sgRNA | (SEQ ID NO: 113) |
| pABG242 | pAAV ula-NLS-Cas13d hU6-DR30-mPcsk9.2 N31-DR36-mApob.3 sgRNA | (SEQ ID NO: 114) |
| pABG243 | pAAV ula-NLS-Cas13d hU6-DR30-mPcsk9.2 N31-DR36-mApob.3 N31 sgRNA | (SEQ ID NO: 115) |
| pABG244 | pAAV ula-NLS-Cas13d hU6-DR30-hmrGFAP.2 sgRNA | (SEQ ID NO: 116) |
| pABG245 | pAAV ula-NLS-Cas13d hU6-DR36-BbsI-DR36-Alw26I-DR36-BsaI sgRNA | (SEQ ID NO: 117) |
| pABG246 | pAAV ula-NLS-Cas13d hU6-DR36-mPcsk9.2 N31 gRNA | (SEQ ID NO: 118) |
| pABG247 | pAAV ula-NLS-Cas13d hU6-DR36-mApob.3 N31 gRNA | (SEQ ID NO: 119) |
| pABG248 | pAAV ula-NLS-Cas13d hU6-DR36-hmANGPTL3.3 gRNA | (SEQ ID NO: 120) |
| pABG249 | pAAV ula-NLS-Cas13d hU6-DR36-BbsI-DR36-LguI-DR36-BsaI sgRNA | (SEQ ID NO: 121) |
| pABG250 | pAAV ula-NLS-Cas13d hU6-DR36-BbsI-DR36-LguI-DR36-mApob.3 sgRNA | (SEQ ID NO: 122) |

```
                                                            (SEQ ID NO: 123)
pABG251 pAAV ula-NLS-Cas13d hU6-DR36-BbsI-DR36-LguI-DR36-mPcsk9.2 sgRNA (SEQ ID NO: 124)
pABG252 pAAV ula-NLS-Cas13d hU6-DR36-BbsI-DR36-LguI-DR36-hmANGPTL3.3 sgRNA (SEQ ID NO: 125)
pABG253 pAAV ula-NLS-Cas13d hU6-DR36-BbsI-DR36-mPcsk9.2-DR36-mApob.3 gRNA (SEQ ID NO: 126)
pABG254 pAAV ula-NLS-Cas13d hU6-DR36-BbsI-DR36-mPcsk9.2-DR36-hmANGPTL3.3 gRNA (SEQ ID NO: 127)
pABG255 pAAV ula-NLS-Cas13d hU6-DR36-hmANGPTL3.3-DR36-mPcsk9.2-DR36-mApob.3 gRNA (SEQ ID NO: 128)
pABG256 pAAV ula-NLS-Cas13d hU6-DR36-mApob.3 N31-DR36-mPcsk9.2 N31-DR36-hmANGPTL3.3 gRNA (SEQ ID NO: 129)
pABG257 pAAV CB6-NLS-Cas13d hU6-DR30-BbsI-DR36-BsaI sgRNA (SEQ ID NO: 130)
pABG258 pAAV CB6-NLS-Cas13d hU6-DR36-BbsI-DR36-LguI-DR36-BsaI sgRNA (SEQ ID NO: 131)
pABG259 pAAV ula-NLS-Cas13d hU6-DR30-hmANGPTL3.3-DR36-mApob.3 N31 gRNA (SEQ ID NO: 132)
pABG260 pAAV ula-NLS-Cas13d hU6-DR30-mApob.3 N31-DR36-hmANGPTL3.3 gRNA (SEQ ID NO: 133)
pABG261 pAAV ula-NLS-Cas13d hU6-DR30-mPcsk9.2 N31-DR36-hmANGPTL3.3 gRNA (SEQ ID NO: 134)
pABG262 pAAV ula-NLS-Cas13d hU6-DR30-hmANGPTL3.3A-DR36-mPcsk9.2 N31 sgRNA (SEQ ID NO: 135)
pABG263 pAAV ula-NLS-Cas13d hU6-DR30-hmPcsk9.4 sgRNA (SEQ ID NO: 136)
pABG264 pAAV ula-NLS-Cas13d hU6-DR30-hmPcsk9.5 sgRNA (SEQ ID NO: 137)
pABG265 pAAV ula-NLS-Cas13d hU6-DR30-hmrGFAP.5 gRNA (SEQ ID NO: 138)
pABG266 pAAV ula-NLS-Cas13d hU6-DR30-hmrGFAP.6 gRNA (SEQ ID NO: 139)
pABG267 pAAV ula-NLS-Cas13d hU6-DR30-hmApob.1 gRNA (SEQ ID NO: 140)
pABG268 pAAV ula-NLS-Cas13d hU6-DR30-hmApob.2 gRNA
```

SEQUENCE LISTING

The patent contains a lengthy sequence listing. A copy of the sequence listing is available in electronic form from the USPTO web site (https://seqdata.uspto.gov/docdetail?docId=US12553063B2). An electronic copy of the sequence listing will also be available from the USPTO upon request and payment of the fee set forth in 37 CFR 1.19(b)(3).

What is claimed is:

1. An isolated nucleic acid encoding a transgene flanked by adeno-associated virus (AAV) inverted terminal repeats (ITRs), wherein the transgene comprises:
   (i) a first nucleic acid sequence encoding an RNA-guided nuclease (RGN) comprising one or more sequences operably linked to a CB6 promoter; and
   (ii) a second nucleic acid sequence comprising a multi guide-RNA (multi-gRNA) expression cassette encoding two or more gRNAs, each gRNA comprising the nucleotide sequence as set forth in any one of SEQ ID NOs: 1-56.

2. The isolated nucleic acid of claim 1, wherein the RGN is a Cas13 family protein or a variant thereof.

3. The isolated nucleic acid of claim 1, wherein the RGN is a Cas13RX or a dCas13 protein.

4. The isolated nucleic acid of claim 1, wherein the multi-gRNA cassette is operably linked to a second promoter.

5. The isolated nucleic acid of claim 4, wherein the second promoter is a U6 promoter.

6. The isolated nucleic acid of claim 1, wherein the multi-gRNA expression cassette encodes 3, 4, or 5 gRNAs.

7. The isolated nucleic acid of claim 1, wherein the multi-gRNA expression cassette comprises the following structure:

$DR_{30}$-[guide sequence-$DR_{36}$-guide sequence-$DR_{36}]_n$-T wherein:
  $DR_{30}$ is a Cas13 direct repeat (DR) sequence comprising 30 nucleotides;
  the guide sequence comprises between 10 and 35 nucleotides;
  $DR_{36}$ is a Cas13 direct repeat (DR) sequence comprising 36 nucleotides; and
  T is a terminator sequence; and
wherein n is an integer between 1 and 50.

8. The isolated nucleic acid of claim 1, wherein the transgene comprises one or more miRNA binding sites.

9. The isolated nucleic acid of claim 1, wherein at least one of the AAV ITRs is an AAV2 ITR.

10. A recombinant adeno-associated virus (rAAV) comprising:
  (i) the isolated nucleic acid of claim 1; and
  (ii) a capsid protein.

11. The rAAV of claim 10, wherein the capsid protein has a tropism for liver tissue.

12. The rAAV of claim 10, wherein the capsid protein is an AAV8 or AAV9 capsid protein.

13. The rAAV of claim 10, wherein the rAAV is formulated for delivery to the liver.

14. A composition comprising an isolated nucleic acid of claim 1 and a pharmaceutically acceptable excipient.

15. A host cell comprising an isolated nucleic acid of claim 1.

16. The host cell of claim 15, wherein the cell is a mammalian cell, bacterial cell, yeast cell, or insect cell.

* * * * *